United States Patent
Iida et al.

(10) Patent No.: US 10,654,172 B2
(45) Date of Patent: May 19, 2020

(54) ROBOT, CONTROL DEVICE, AND ROBOT SYSTEM

(71) Applicant: Seiko Epson Corporation, Tokyo (JP)

(72) Inventors: Izumi Iida, Shiojiri (JP); Hiroyuki Kawada, Suwa (JP)

(73) Assignee: Seiko Epson Corporation (JP)

( * ) Notice: Subject to any disclaimer, the term of this patent is extended or adjusted under 35 U.S.C. 154(b) by 252 days.

(21) Appl. No.: 15/593,810

(22) Filed: May 12, 2017

(65) Prior Publication Data

US 2017/0326734 A1    Nov. 16, 2017

(30) Foreign Application Priority Data

May 16, 2016 (JP) ................... 2016-097689
Feb. 17, 2017 (JP) ................... 2017-027617

(51) Int. Cl.
B25J 13/08 (2006.01)
B25J 9/16 (2006.01)

(52) U.S. Cl.
CPC ........... *B25J 13/085* (2013.01); *B25J 9/1674* (2013.01); *B25J 13/088* (2013.01); *G05B 2219/40202* (2013.01); *G05B 2219/40203* (2013.01); *G05B 2219/49138* (2013.01)

(58) Field of Classification Search
CPC ...... B25J 13/085; B25J 13/088; B25J 9/1674; B25J 9/1694; G05B 2219/40202; G05B 2219/40203; G05B 2219/49138
See application file for complete search history.

(56) References Cited

U.S. PATENT DOCUMENTS

| | | | |
|---|---|---|---|
| 6,131,299 A * | 10/2000 | Raab | G01B 21/04 33/503 |
| 7,391,178 B2 | 6/2008 | Tanaka et al. | |
| 7,664,570 B2 | 2/2010 | Suita et al. | |
| 2003/0208302 A1* | 11/2003 | Lemelson | G05B 19/19 700/245 |
| 2008/0240511 A1* | 10/2008 | Ban | B25J 9/1697 382/108 |
| 2014/0277723 A1* | 9/2014 | Nishimura | B25J 9/1676 700/255 |
| 2017/0182662 A1* | 6/2017 | Huang | B25J 19/06 |
| 2017/0357242 A1* | 12/2017 | Watanabe | B25J 19/06 |

FOREIGN PATENT DOCUMENTS

JP    2004-322244 A    11/2004
WO   WO-2004-009303 A1   1/2004

* cited by examiner

*Primary Examiner* — Robert T Nguyen

(74) *Attorney, Agent, or Firm* — Harness, Dickey & Pierce, P.L.C.

(57) ABSTRACT

A robot includes a movable unit that is movable in a first region and a second region. In a case where a first portion of the movable unit is positioned within the second region, a speed of the first portion is not 0 and is limited to a speed lower than the maximum speed of the first portion in a case where the first portion is positioned within the first region.

8 Claims, 10 Drawing Sheets

ROBOT, CONTROL DEVICE, AND ROBOT SYSTEM

BACKGROUND

1. Technical Field

The present invention relates to a robot, a control device, and a robot system.

2. Related Art

Robots have been used in industries.

For example, a robot is actuated on an inner side of a physical safety fence in some cases; however, in these cases, the robot occupies a large area, and thus it takes costs and time to build the safety fence.

In this respect, a technology in which a virtual safety fence is set up and thereby there is no need to build the physical safety fence has been studied (see JP-A-2004-322244).

However, in a case of using such a virtual safety fence, a free running distance from a state in which a robot is actuated at the maximum speed through a start of speed reduction to a state of stopping of the robot is also set, and thus it is not possible to reduce an occupation area in some cases. In this case, when the occupation area is excessively reduced, the robot has a narrow movable space, and thus work content that can be performed by the robot is limited in some cases.

In the related art, there has been a demand for narrowing the occupation area of the robot. Particularly, in an environment in which a robot and a human coexist, the demand for narrowing the occupation area of the robot increases.

SUMMARY

An aspect of the invention is directed to a robot including a movable unit that is movable in a first region and a second region. A speed of a first portion that is obtained in a case where the first portion of the movable unit is positioned within the second region is not 0 and is limited to a speed lower than the maximum speed of the first portion that is obtained in a case where the first portion is positioned within the first region.

According to this configuration, in the robot, the speed of the first portion that is obtained in the case where the first portion of the movable unit is positioned within the second region is not 0 and is limited to a speed lower than the maximum speed of the first portion that is obtained in a case where the first portion is positioned within the first region. In this manner, in the robot, it is possible to narrow an occupation area of the robot.

The aspect of the invention may be configured such that, in the robot, the second region is positioned farther apart from a base of the movable unit than the first region.

According to this configuration, in the robot, the second region is positioned farther apart from the base of the movable unit than the first region. In this manner, in the robot, it is possible to narrow the occupation area of the robot in the case where the second region is positioned farther apart from the base of the movable unit than the first region.

The aspect of the invention may be configured such that, in the robot, the base is disposed within the first region.

According to this configuration, in the robot, the base is disposed within the first region. In this manner, in the robot, it is possible to narrow an occupation area of the robot in the case where the base is disposed within the first region.

The aspect of the invention may be configured such that, in the robot, a third region, in which the maximum speed of the first portion changes, is set between the first region and the second region.

According to this configuration, in the robot, the third region, in which the maximum speed of the first portion changes, is set between the first region and the second region. In this manner, in the robot, it is possible to narrow the occupation area of the robot in the case where the third region, in which the maximum speed of the first portion changes, is set between the first region and the second region.

The aspect of the invention may be configured such that the robot further includes a first object detector that detects a first object.

According to this configuration, in the robot, the first object detector detects the first object. In this manner, in the robot, it is possible to perform actuation, based on results of detection of the first object by the first object detector.

The aspect of the invention may be configured such that, in the robot, a third region, in which the maximum speed of the first portion changes, is set between the first region and the second region, the robot further includes a first object detector that detects a first object, and, in a case where the first object is determined to enter the third region based on a detection result of the first object detector, the speed of the first portion in the first region is limited to a speed lower than the maximum speed of the first portion in the first region in a case where the first object is not determined to enter the third region.

According to this configuration, in the robot, in a case where the first object is determined to enter the third region, the speed of the first portion in the first region is limited to a speed lower than the maximum speed of the first portion in the first region in the case where the first object is not determined to enter the third region. In this manner, in the robot, it is possible to reduce the speed of actuation in a case where the first object is determined to enter the third region.

The aspect of the invention may be configured such that, in the robot, a third region, in which the maximum speed of the first portion changes, is set between the first region and the second region, the robot further includes a first object detector that detects a first object, and a position of the third region set in a case where a distance between the first object and the robot is a first distance is closer to the base than a position of the third region set in a case where a distance between the first object and the robot is a second distance longer than the first distance.

According to this configuration, in the robot, the position of the third region set in the case where the distance between the first object and the robot is the first distance is closer to the base than the position of the third region set in the case where the distance between the first object and the robot is the second distance longer than the first distance. In this manner, in the robot, it is possible to change the position of the third region, based on the distance between the first object and the robot, for example, it is possible to expand or reduce the first region.

The aspect of the invention may be configured such that the robot further includes a speed detector that detects a speed of the first portion.

According to this configuration, in the robot, the speed detector detects the speed of the first portion. In this manner, in the robot, it is possible to perform actuation, based on results of detection of the speed of the first portion by the speed detector.

The aspect of the invention may be configured such that the robot further includes a force detector that detects a force.

According to this configuration, in the robot, the force detector detects the force. In this manner, in the robot, it is possible to perform actuation, based on results of detection of the force by the force detector.

The aspect of the invention may be configured such that the robot further includes: a second object detector that detects a distance to a second object; and a display unit that displays information related to the distance.

According to this configuration, in the robot, the second object detector detects a distance to the second object, and the information related to the distance is displayed. In this manner, in the robot, it is possible to notify an operator of the information related to the distance to the second object.

The aspect of the invention may be configured such that, in the robot, the display unit is provided in the movable unit.

In this configuration, in the robot, the information is displayed on the display unit provided in the movable unit. In this manner, in the robot, it is possible to display the information on a portion which is easily seen by an operator or the like.

In the robot, a configuration, in which the information displayed on the display unit varies depending on each of a case where the first portion is positioned within the first region, a case where the first portion is positioned within the second region, and a case where the first portion is positioned within a region between the first region and the second region, in which the maximum speed of the first portion changes.

According to this configuration, in the robot, the information varies depending on each of the case where the first portion is positioned within the first region, the case where the first portion is positioned within the second region, and the case where the first portion is positioned within the region (third region) between the first region and the second region, in which the maximum speed of the first portion changes. In this manner, in the robot, it is possible to display the information for notifying the region in which the first portion is positioned.

Another aspect of the invention is directed to a control device that controls the robot described above.

According to this configuration, in the control device of the robot, the speed of the first portion that is obtained in the case where the first portion of the movable unit is positioned within the second region is not 0 and is limited to a speed lower than the maximum speed of the first portion that is obtained in the case where the first portion is positioned within the first region. In this manner, in the control device of the robot, it is possible to narrow the occupation area of the robot.

Still another aspect of the invention is directed to a robot system including: the robot described above; and a control device that controls the robot.

According to this configuration, in the robot system of the robot, the speed of the first portion that is obtained in the case where the first portion of the movable unit is positioned within the second region is not 0 and is limited to a speed lower than the maximum speed of the first portion that is obtained in the case where the first portion is positioned within the first region. In this manner, in the robot system of the robot, it is possible to narrow the occupation area of the robot.

As described above, in the robot, the control device, and the robot system according to the aspects of the invention, the speed of the first portion that is obtained in the case where the first portion of the movable unit is positioned within the second region is not 0 and is limited to a speed lower than the maximum speed of the first portion that is obtained in the case where the first portion is positioned within the first region. In this manner, in the robot, the control device, and the robot system according to the aspects of the invention, it is possible to narrow the occupation area of the robot.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described with reference to the figures.

First Embodiment

Outline of Robot System

Figure 1:
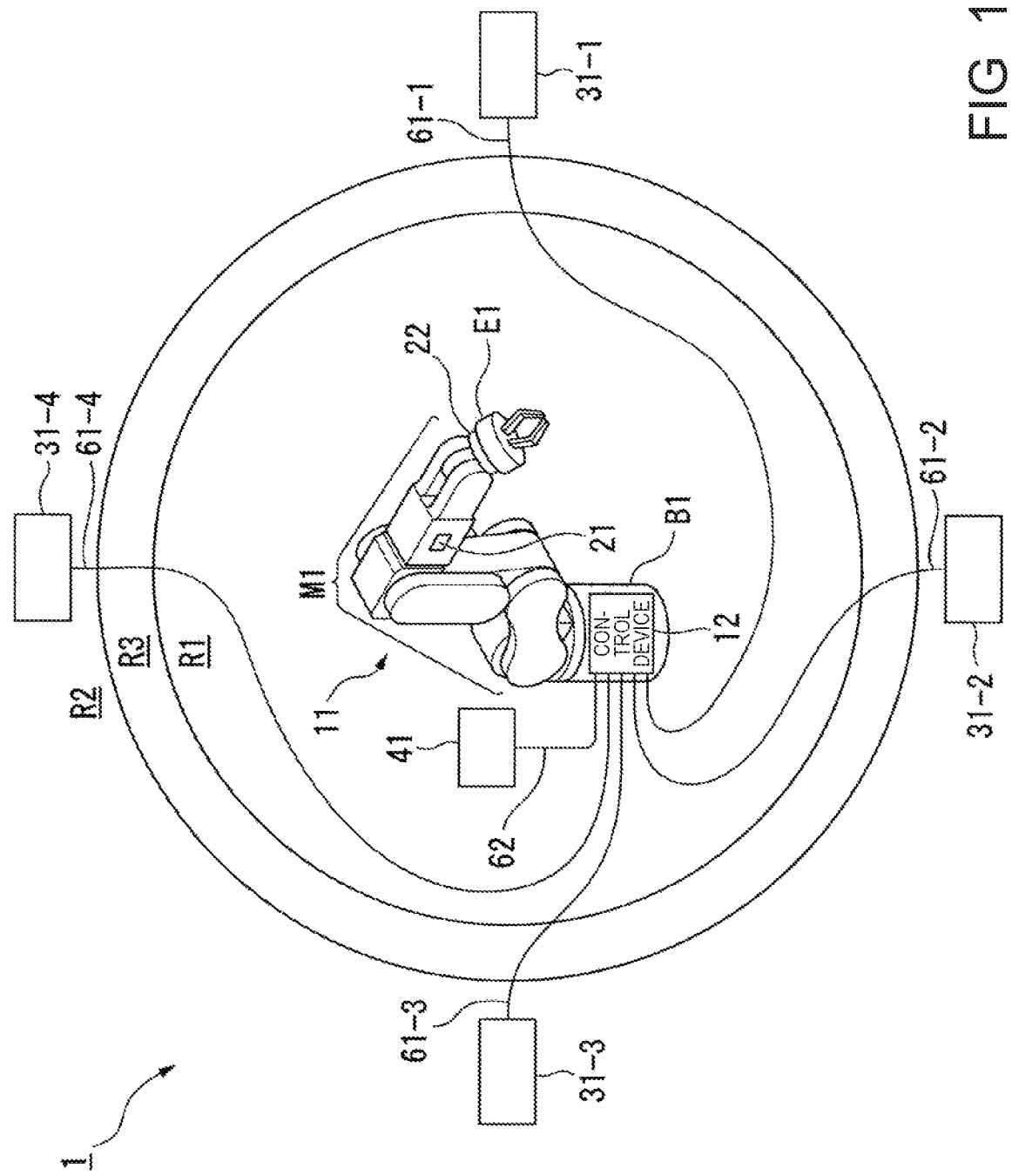
FIG. 1 is a diagram schematically illustrating an example of a configuration of a robot system according to an embodiment (first embodiment) of the invention.

FIG. 1 is a diagram schematically illustrating an example of a configuration of a robot system 1 according to an embodiment (first embodiment) of the invention.

The robot system 1 includes a robot 11, a control device 12 of the robot 11, a speed detector 21, a force detector 22, four object detectors (hereinafter, referred to as "first object detectors") 31-1 to 31-4, one object detector (hereinafter, referred to as a "second object detector") 41, cables 61-1 to 61-4 and 62.

The robot 11 includes a base (support base) B1, a manipulator M1, and an end effector E1.

Here, in the embodiment, the robot 11 is installed on a flat surface (or a substantially flat surface), and regions and distances obtained when the flat surface is viewed in a vertical direction with respect to the flat surface (that is, when viewed in a plan view) are used as regions and distances, respectively. The flat surface may be a floor of a building or the ground.

Note that, as another example, the regions and distances obtained when viewed in three dimensions instead of the plan view.

In addition, as still another example, in a case where the robot 11 is installed on a surface other than the flat surface, the regions and distances may be defined in any method. For example, the regions and distances maybe defined in a plan view in any direction, or may be defined in three dimensions.

In addition, regions or distances which are defined in different methods for each of a plurality of regions or for each of a plurality of distances may be used.

FIG. 1 illustrates, as a plurality of regions, a first region (hereinafter, referred to as a "high-speed region") R1 including the robot 11, a third region (hereinafter, referred to as a "maximum-speed-change region") R3 on the outer side from the high-speed region R1, and a second region (hereinafter, referred to as a "low-speed region") R2 on the outer side from the maximum-speed-change region R3.

In the embodiment, both of the high-speed region R1 and the maximum-speed-change region R3 have a circular (or substantially circular) shape around the base B1 of the robot 11 in the plan view described above. As another example of the configuration, both of the high-speed region R1 and the maximum-speed-change region R3 may have any shape.

Here, the base B1 of the robot 11 is present inside the high-speed region R1. The low-speed region R2 exists at a position farther apart from the base B1 of the robot 11 than the high-speed region R1.

In the embodiment, the robot 11 is a single-arm robot. In another example of the configuration, any robot maybe used, for example, a dual-arm robot (a type of multi-arm robot) having two arms, a multi-arm robot having three or more arms, a SCARA robot, or a cartesian coordinate robot may be used. The cartesian coordinate robot is, for example, a gantry robot.

In the embodiment, the control device 12 is installed inside the base B1 of the robot 11. In other words, the robot 11 is integral with the control device 12. As another example of a configuration, the control device 12 may be provided separately from the robot 11.

Description of Robot

The base B1 of the robot 1 is installed.

One end of the manipulator M1 of the robot 11 is connected to the base B1. The other end of the manipulator M1 of the robot 11 is connected to the end effector E1 via the force detector 22.

The manipulator M1 of the robot 11 has a six-axes vertical multijoint type structure and includes six joints. The joints includes actuators (not illustrated), respectively. In the robot 11, the actuators of the six joints, respectively, are actuated, and thereby actuation in degrees of freedom of six axes is performed. In another example of a configuration, a robot, in which actuation in degrees of freedom of five or less axes is performed, or a robot, in which actuation in degrees of freedom of seven or more axes is performed, may be used.

The end effector E1 of the robot 11 is, for example, a hand, and includes a finger portion that is capable of gripping an object. As another example of a configuration, the end effector E1 of the robot 11 maybe any one of, for example, an end effector that suctions an object by using air suction, or an end effector that brings an object close by using a magnetic force.

Description of Control Device

The control device 12 is connected to the robot 11 to be capable of communicating with the robot via a cable (not illustrated). As another example of a configuration, the control device 12 maybe connected to the robot 11 to be capable of communicating with the robot via wireless communication.

The control device 12 controls the robot 11. For example, the control device 12 controls the respective actuators included in the manipulator M1 and the end effector E1.

The control device 12 receives information of detection results from the speed detector 21, the force detector 22, the respective first object detectors 31-1 to 31-4, and the second object detector 41, respectively.

As an example, the control device 12 may control the robot 11, based on one or more items of detection information received from the speed detector 21, the force detector 22, and the respective first object detectors 31-1 to 31-4, respectively.

As an example, the control device 12 may control the robot 11, based on the detection information received from the second object detector 41.

The control device 12 may transmit command information to the speed detector 21, the force detector 22, the respective first object detectors 31-1 to 31-4, and the second object detector 41, respectively.

Figure 2:
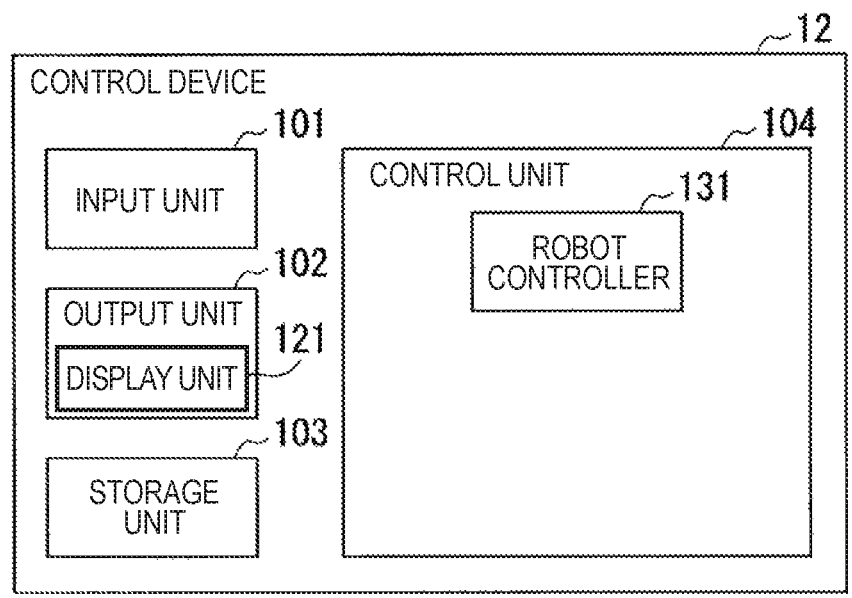
FIG. 2 is a diagram schematically illustrating an example of a configuration of a control device according to the embodiment (first embodiment) of the invention.

FIG. 2 is a diagram schematically illustrating an example of a configuration of the control device 12 according to the embodiment (first embodiment) of the invention.

The control device 12 includes an input unit 101, an output unit 102, a storage unit 103, and a control unit 104. The output unit 102 includes a display unit 121. The control unit 104 includes a robot controller 131.

The input unit 101 inputs information from the outside.

As an example, the input unit 101 inputs information transmitted from the speed detector 21, the force detector 22, the respective first object detectors 31-1 to 31-4, and the second object detector 41, respectively. As another example, the input unit 101 may include an operating unit such as a keyboard or a mouse, and may input information in response to an operation performed on the operating unit by a user (human).

The output unit 102 outputs information to the outside.

As an example, the output unit 102 outputs (transmits) information to the speed detector 21, the force detector 22, the respective first object detectors 31-1 to 31-4, and the second object detector 41, respectively. As another example, the output unit 102 displays and outputs the information by the display unit 121. The display unit 121 is, for example, a display device having a screen, and displays and outputs the information on the screen. As another example, the output unit 102 may output the information through another method, or, for example, may output the information in a sound (including a voice).

In the embodiment, the control device 12 includes the display unit 121; however, as another example, the control device 12 may be configured separately from the display unit 121.

The storage unit 103 stores the information. As an example, the storage unit 103 stores control programs and information of various types of parameters that are used in the control unit 104. As another example, the storage unit 103 may store any item of information, and, for example, may store information such as an image used during the control of the robot 11.

The control unit 104 performs various types of control in the control device 12. For example, the control unit 104 performs the various types of control, based on the control programs and information of various types of parameters stored in the storage unit 103.

The control unit 104 controls the actuation of the robot 11 by the robot controller 131.

In the embodiment, the control unit 104 controls a speed of a predetermined portion of a movable portion (in the embodiment, the manipulator M1 and the end effector E1) as a portion that is capable of moving in the robot 11, for example, in accordance with instruction content instructed in advance, and thereby the speed of the predetermined portion is to be reduced to a speed lower than or equal to the predetermined maximum speed. The predetermined maximum speed is set for each of the regions (the high-speed region R1, the low-speed region R2, and the maximum-speed-change region R3).

In the embodiment, the maximum speed in the high-speed region R1 is set to a value that does not depend on a position in the region, the maximum speed in the low-speed region R2 is set to a value that does not depend on a position in the region, and the maximum speed in the maximum-speed-change region R3 is set to a value that depends on a position in the region. The maximum speed in the high-speed region R1 may be set to a constant value, or may be set to a variable value depending on a peripheral circumstance when the robot 11 is actuated. The maximum speed in the low-speed region R2 may be set to a constant value, or may be set to a variable value depending on a peripheral circumstance when the robot 11 is actuated. A change characteristic of the maximum speed in the maximum-speed-change region R3 may be set to a constant characteristic, or may be set to a variable characteristic depending on a peripheral circumstance when the robot 11 is actuated.

In a case where the maximum speed in the high-speed region R1 or the low-speed region R2 is set to the constant value, the control unit 104 controls the speed of the predetermined portion of the movable unit in the robot 11 to be a speed lower than or equal to the maximum speed. On the other hand, in a case where the maximum speed in the high-speed region R1 or the low-speed region R2 is variable depending on the peripheral circumstance when the robot 11 is actuated, the control unit 104 controls the speed of the predetermined portion of the movable unit in the robot 11 to be a speed lower than or equal to the maximum speed, by using the maximum speed in response to the detection result of the peripheral circumstance during the actuation of the robot 11.

In a case where the change characteristic of the maximum speed in the maximum-speed-change region R3 is set to the constant characteristic, the control unit 104 controls the speed of the predetermined portion of the movable unit in the robot 11 to be a speed lower than or equal to the maximum speed, by using the maximum speed determined using the change characteristic. On the other hand, in a case where the change characteristic of the maximum speed in the maximum-speed-change region R3 is variable depending on the peripheral circumstance when the robot 11 is actuated, the control unit 104 controls the speed of the predetermined portion of the movable unit in the robot 11 to be a speed lower than or equal to the maximum speed, by using the maximum speed determined using the change characteristic in response to the detection result of the peripheral circumstance during the actuation of the robot 11.

Here, setting related to the maximum speed in the regions (the high-speed region R1, the low-speed region R2, and the maximum-speed-change region R3) may be performed by the user, for example, at a time point of instruction of the robot 11. The maximum speed in the high-speed region R1 or the low-speed region R2 may be set to a constant value that does not change depending on the peripheral circumstance when the robot 11 is actuated at the time point of the instruction, or a characteristic (for example, an expression or a table for determining the maximum speed) by which the maximum speed changes depending on the peripheral circumstance may be set. The change characteristic of the maximum speed in the maximum-speed-change region R3 may be set to a characteristic that does not change depending on the peripheral circumstance when the robot 11 is actuated at the time point of the instruction, or may be set to a characteristic (for example, an expression or a table for determining the change characteristic of the maximum speed) by which the change characteristic of the maximum speed changes depending on the peripheral circumstance.

For example, a circumstance of a subject (human or an object other than a human) that is present on the periphery of the robot 11 maybe used as the peripheral circumstance when the robot 11 is actuated.

The maximum speed that is controlled by the control unit 104 is not the maximum speed as the specification of the robot 11, but, for example, is the maximum speed that can be adjusted by the control unit 104 through the control of the actuation of the robot 11 in accordance with the instruction content instructed in advance. For example, the maximum speed as the specification of the robot 11 is the maximum speed written on a product catalog of the robot 11.

Description of Speed Detector

The speed detector 21 detects a speed related to the robot 11.

In the embodiment, the speed detector 21 is provided in a predetermined portion in a unit (movable unit) that is capable of moving in the robot 11. The speed detector 21 detects a speed of the predetermined portion and transmits information related to the detected results to the control device 12. For example, the portion movable in the robot 11 is a portion of the manipulator M1 or a portion of the end effector E1.

In the embodiment, the control unit 104 controls the speed of the predetermined portion of the movable unit in the robot 11, based on the information of the detection results by the speed detector 21. In this case, the control unit 104 may control the movable unit such that the movable unit realizes actuation procedure containing the speed, based on the information of the actuation procedure of the movable unit which contains the speed. For example, the information of the actuation procedure of the movable unit which contains the speed is set at the time of instruction.

In the embodiment, the speed detector 21 is provided in the manipulator M1 of the robot 11.

As another example of a configuration, the speed detector 21 may be provided in any portion that is movable in the robot 11, and, for example, may be provided in the end effector E1 of the robot 11.

In the embodiment, the speed detector 21 is connected to the control device 12 to be capable of communicating with the control device via a cable (not illustrated); however, as another example of a configuration, the speed detector may be connected to the control device 12 to be capable of communicating with the control device via wireless communication.

In the embodiment, the single speed detector 21 is provided; however, as another example of the configuration, a plurality of speed detectors may be provided, and the speed detectors may be provided on different portions of the robot 11.

In addition, as the information (information related to the results of detecting the speed of the predetermined portion) transmitted by the speed detector 21, information indicating a speed of a predetermined portion (an example of a first portion) maybe used, or information indicating a speed of a portion other than the predetermined portion may be used in a case where it is possible to detect (it may be possible to estimate) the speed of the portion (another example of the first portion) other than the predetermined portion, based on the speed of the predetermined portion.

As an example, the speed that is transmitted and is notified (informed) to the control device 12 from the speed detector 21 may be detected from a portion having the maximum speed (or portion estimated to have the maximum speed) in the movable unit of the robot 11, and, for example, maybe detected at a tool center point (TCP) set as the gravity center of the end effector E1.

As another example, the speed that is transmitted and is notified (informed) from the speed detector 21 to the control device 12 maybe the speed of the portion of the movable unit in the robot 11, which is farthest apart from the position of the base B1.

As still another example, the speed that is transmitted and is notified (informed) from the speed detector 21 to the control device 12 may be detected in a portion of the movable unit in the robot 11, which enters the outermost region and is positioned on the outermost side in the region. The position is a portion on a distal end of the end effector E1 in some cases, or is a portion corresponding to an elbow of the manipulator M1.

In the embodiment, the high-speed region R1 exists on the innermost side, the low-speed region R2 exists on the outermost side, and the maximum-speed-change region R3 exists between the regions.

As an example, the speed detector 21 may be provided on a drive unit (for example, an encoder or the like) of a predetermined axis of a plurality of axes provided in the manipulator M1 of the robot 11. As another example, the same number of speed detectors as the plurality of axes provided in the manipulator M1 of the robot 11 may be provided, and the speed detectors may be provided on the plurality of axes, respectively.

For example, the speed detector 21 reads a value of the encoder in the drive unit of a predetermined axis, thereby detecting a rotation speed of the axis. In this manner, it is possible to detect the speed of the portion driven by the axis.

In addition, the speed detector 21 may be provided on a position other than the robot 11 so as to detect a speed of a predetermined portion of the robot 11. In this case, as an example, the speed detector 21 may be provided with a camera that captures an image and a calculation device that performs processing on the captured image. Then, the speed detector may capture an image of a predetermined portion of the robot 11, may compare a plurality of images captured at different time, and may detect a speed of the predetermined portion. As another example, the speed detector 21 may be provided with a laser. Then, a predetermined portion may be irradiated with light emitted from the laser, and a speed of the predetermined portion may be detected, based on reflected light. As another example, the speed detector 21 may be provided with an ultrasonic oscillator. Then, a predetermined portion may be irradiated with an ultrasonic wave emitted from the ultrasonic oscillator, and a speed of the predetermined portion may be detected, based on a reflected sound wave.

Description of Force Detector

The force detector 22 detects one or both of a translational force and torque applied to the force detector 22, and thereby one or both of the translational force and torque applied to the robot 11 are detected. The force detector 22 transmits information related to the detected results to the control device 12. For example, the information means one or both of information indicating the translational force and information indicating the torque.

In the embodiment, the force detector 22 is provided in a portion (portion corresponding to a wrist) between the manipulator M1 and the end effector E1.

As another example of a configuration, the force detector 22 may be provided in another portion of the robot 11. For example, the force detector may be provided in the manipulator M1 of the robot 11.

In the embodiment, the force detector 22 is connected to the control device 12 to be capable of communicating with the control device via a cable (not illustrated); however, as another example of a configuration, the force detector may be connected to the control device 12 to be capable of communicating with the control device via wireless communication.

In the embodiment, the single force detector 22 is provided; however, as another example of the configuration, a plurality of force detectors may be provided, and the force detectors may be provided on different portions of the robot 11.

As another example of a configuration, a torque sensor may be used as the force detector 22, and the force detector may be provided in the manipulator M1.

The force detector 22 may perform detection using a quartz sensor. In general, the quartz sensor is effective in that the quartz sensor has high stiffness, maintains accuracy of detection when detection is repeatedly performed, realizes high acceleration and deceleration of the robot 11, and reduces small residual vibration in the robot 11.

Description of First Object Detector

In the embodiment, the respective first object detectors 31-1 to 31-4 are provided in the low-speed region R2, particularly, are provided in the vicinity of a boundary between the low-speed region R2 and the maximum-speed-change region R3.

As another example of a configuration, the respective first object detectors 31-1 to 31-4 may be provided in any portion, for example, may be provided in the maximum-speed-change region R3, or may be provided in the vicinity of the boundary between the low-speed region R2 and the maximum-speed-change region R3. As another example of a configuration, the respective first object detectors 31-1 to 31-4 maybe provided to straddle over the boundary between the low-speed region R2 and the maximum-speed-change region R3.

In the embodiment, the respective first object detectors 31-1 to 31-4 are connected to the control device 12 to be capable of communicating with the control device via the cables 61-1 to 61-4.

As another example of a configuration, the respective first object detectors 31-1 to 31-4 and the control device 12 may be connected to be capable of communicating with each other via wireless communication.

In the embodiment, the four first object detectors 31-1 to 31-4 have the same function. Therefore, the first object detector 31-1 is described as an example.

In the embodiment, the first object detector 31-1 detects an object without distinguishing between a living matter (including a human) and a matter other than the living matter. In this case, the object includes the living matter and the matter other than the living matter.

As another example of a configuration, the first object detector 31-1 may have a function of distinguishing between the living matter and a non-living matter (matter other than the living matter) and performing detection of any one or both of the living matter and the non-living matter. In this case, in the embodiment, the first object detector 31-1 detects the living matter.

The first object detector 31-1 detects that an object is positioned to cross the boundary between the low-speed region R2 and the maximum-speed-change region R3. For example, in a case where an object that is movable is not present in the high-speed region R1 and the maximum-speed-change region R3 in an initial state, it is possible to consider that the object moves (enters) the maximum-speed-change region R3 from the low-speed region R2 when the first object detector 31-1 detects the object. In addition, in a case where the object moves (enters) from the low-speed region R2 to the maximum-speed-change region R3, and then the object does not cross the boundary between the low-speed region R2 and the maximum-speed-change region R3, it is possible to consider that the object is present in any one of the maximum-speed-change region R3 and the high-speed region R1.

As another example of a configuration, the first object detector 31-1 may be possible to detect an orientation of the movement of the object, or has a function of detecting the object that moves (enters) from the low-speed region R2 to the maximum-speed-change region R3.

As an example of a configuration, the first object detector 31-1 has the function of detecting the object that moves (enters) from the low-speed region R2 to the maximum-speed-change region R3, and may have a function of detecting the object that moves to the low-speed region R2 from the maximum-speed-change region R3.

Here, in the embodiment, the first object detector 31-1 detects that the object is positioned to cross the boundary between the low-speed region R2 and the maximum-speed-change region R3; however, as another example of a configuration, the first object detector 31-1 may detect that the object is positioned to cross the boundary between the high-speed region R1 and the maximum-speed-change region R3. In this case, the first object detector 31-1 is provided, for example, in the vicinity of the boundary between the high-speed region R1 and the maximum-speed-change region R3. In this case, the first object detector 31-1 may be provided, for example, in the high-speed region R1, may be provided in the maximum-speed-change region R3, or may be provided to straddle the boundary therebetween.

As another example of a configuration, the first object detector 31-1 may have a function of detecting that the object is present in a predetermined region. For example, the predetermined region may be the high-speed region R1 or the maximum-speed-change region R3, or may be a region obtained by combining the high-speed region R1 and the maximum-speed-change region R3. In this case, the first object detector 31-1 may be provided in any portion.

Note that, for example, a sensor (invasion detecting sensor) that detects invasion of a human may be used as the first object detector. As the first object detector, one or more selected from a light curtain, laser scanner, an image sensor (for example, a camera), an ultrasonic sensor, a laser rangefinder, or the like may be used.

In addition, both of a first object detector that has a function of detecting that the object moves (passes) through a predetermined boundary, and a first object detector that has a function of detecting that an object is present in a predetermined region may be provided in the robot system 1. In this case, the single first object detector may have both of the functions.

Here, in the embodiment, the respective first object detectors 31-1 to 31-4 may be disposed at equal intervals (or substantially equal intervals) on the boundary between the low-speed region R2 and the maximum-speed-change region R3. In this manner, in the embodiment, it is possible to detect the object over the entire circumference of the boundary between the low-speed region R2 and the maximum-speed-change region R3 by any of the first object detectors 31-1 to 31-4.

As another example of a configuration, the first object detectors 31-1 to 31-4 may be disposed in any position. For example, a configuration in which it is possible to detect the object only on a part of the entire circumference of the boundary between the low-speed region R2 and the maximum-speed-change region R3 may be used.

In the embodiment, the four first object detectors 31-1 to 31-4 are provided; however, as another example of the configuration, the number of the first object detectors may be arbitrarily selected.

Description of Second Object Detector

In the embodiment, the second object detector 41 is provided in the vicinity (on the periphery) of the robot 11.

As another example of a configuration, the second object detector 41 may be provided in any portion. For example, the second object detector may be provided in the robot 11.

In the embodiment, the second object detector 41 is connected to the control device 12 to be capable of communicating with the control device via the cable 62.

As another example of the configuration, the second object detector 41 and the control device 12 may be connected to be capable of communicating with each other via wireless communication.

The second object detector 41 detects (measures) a predetermined distance (distance to the object) related to the object, and transmits information related to the detected results to the control device 12. As the predetermined distance, for example, a distance between the object and a predetermined position of the second object detector 41 may be used, or a distance between the object and a predetermined position of the robot 11 may be used. Any position may be used as the predetermined position of the second object detector 41. In addition, as the predetermined position of the robot 11, any position may be used, or, for example, a position of the base B1 of the robot 11 may be used.

In the embodiment, the second object detector 41 detects an object without distinguishing between a living matter (including a human) and a matter other than the living matter. In this case, the object includes the living matter and the matter other than the living matter.

As another example of a configuration, the second object detector 41 may have a function of distinguishing between the living matter and a non-living matter (matter other than the living matter) and performing detection of any one or both of the living matter and the non-living matter. In this case, in the embodiment, the second object detector 41 detects the living matter.

In the embodiment, the single second object detector is provided; however, as another example of the configuration, the number of the second object detectors may be arbitrarily selected.

In a case where a plurality of second object detectors are provided, the plurality of second object detectors may be arbitrarily disposed. In this case, for example, a detection result may be employed from one second object detector 41 of the plurality of second object detectors, or an average value of the detection results from two or more (or all) second object detectors may be employed.

As the second object detector 41, one or more selected from a light curtain, laser scanner, an image sensor (for example, a camera), an ultrasonic sensor, a laser rangefinder, or the like may be used.

In the embodiment, the first object detectors 31-1 to 31-4 are provided as separate detectors from the second object detector 41; however, as another example of the configuration, the first object detectors 31-1 to 31-4 and the second object detector 41 may be configured as a common detector.

Description of Region

The high-speed region R1 is a region in which the robot 11 is allowed to move at a high speed (significant speed). For example, the high speed may be the maximum speed (here, the maximum speed as the specification) of the robot 11. For example, the high-speed region R1 may be set, depending on content or the like of work performed by the robot 11.

In the embodiment, the maximum speed (hereinafter, referred to as the "maximum speed for the high-speed region"), which is allowed for the robot 11, is set in the high-speed region R1. For example, the maximum speed for the high-speed region may be the maximum speed as the specification of the robot 11, or may be a speed lower than the maximum speed.

The low-speed region R2 is a region in which the robot 11 needs to move at a low speed (insignificant speed). For example, the low speed means a speed at which safety of a human is secured even when the robot 11 collides with the human.

In the embodiment, the robot 11 is also capable of moving at the low speed in the low-speed region R2.

In the embodiment, the maximum speed (hereinafter, referred to as the "maximum speed for the low-speed region"), which is allowed for the robot 11, is set in the low-speed region R2.

Here, the speed (safety speed) regulated in standards related to a striking force applied to a human body may be used as the maximum speed for the low-speed region (refer to ISO/TS 15066 Robots and robotic devices—Collaborative robots).

In general, the safety speed is determined, depending on a degree of harm to a human body by the robot 11. For example, it is possible to determine the safety speed, based on the striking force applied to the human body and an amount of pushing from the human body surface in a time taken from detection of an external force by a sensor (in the embodiment, the force detector 22) that detects the external force to a point when the robot 11 stops. For example, the safety speed may not only be set for each of the robot 11, but any safety speed may be set for each work or tool that is gripped by the robot 11.

As another example, a speed lower than the safety speed may be used as the maximum speed for the low-speed region.

The maximum-speed-change region R3 is a region in which the maximum speed (hereinafter, referred to as the "maximum speed for the maximum-speed-change region"), which is allowed for the robot 11, changes, depending on a distance from a reference position (in the embodiment, a position of the base B1 of the robot 11).

In the maximum-speed-change region R3, the maximum speed for the maximum-speed-change region R3 decreases as deceleration to be closer to the low-speed region R2 from the high-speed region R1 on the entirety or a part of a line (for example, a line through the shortest distance) that connects the high-speed region R1 and the low-speed region R2. Conversely, in the maximum-speed-change region R3, the maximum speed for the maximum-speed-change region R3 increases as acceleration to be closer to the high-speed region R1 from the low-speed region R2 on the line.

Note that, in the embodiment, negative acceleration means the deceleration.

Here, characteristics of the deceleration or the acceleration (hereinafter, also referred to as "deceleration/acceleration") at which the speed before the change reaches a speed after the change may have a straight line shape or may have a curve shape. A curve subjected to the spline interpolation may be used as an example of the curve and smooth deceleration or acceleration may be performed. For example, the deceleration/acceleration may be a constant value in the maximum-speed-change region R3 or may be a variable value.

The embodiment employs a configuration in which, in a case where a portion of the robot is closer to the low-speed region R2 from the high-speed region R1 in the maximum-speed-change region R3, the maximum speed for the maximum-speed-change region reaches the maximum speed for the low-speed region before the portion reaches the boundary between the low-speed region R2 and the maximum-speed-change region R3, and the speed becomes constant to the boundary.

In addition, the maximum-speed-change region R3 and the high-speed region R1 may be regions which are occupied by the robot 11, that is, may be regions assumed that a human other than the robot 11 does not enter. For example, when a configuration, in which a safety fence (including a virtual safety fence) is provided, is assumed, the region occupied by the robot 11 corresponds to a region on the inner side of the safety fence.

Description of Actuation of Robot

Figure 18:
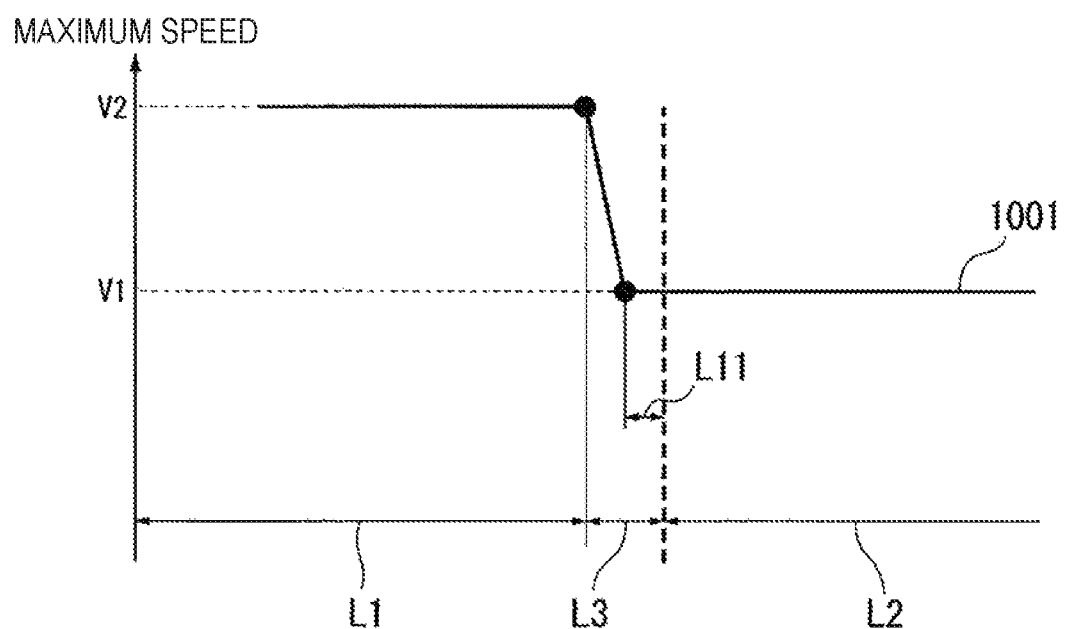
FIG. 18 is a diagram illustrating an example of the maximum speed for each region according to the embodiment (first embodiment) of the invention.

FIG. 18 is a diagram illustrating an example of the maximum speed for each region according to the embodiment (first embodiment) of the invention.

In FIG. 18, the horizontal axis represents ranges of the regions, respectively. The vertical axis represents the maximum speeds in the regions, respectively.

Specifically, a range L1 of the high-speed region R1, a range L2 of the low-speed region R2, a range L3 of the maximum-speed-change region R3, and a range L11 in which the maximum speed in the maximum-speed-change region R3 is a safety speed are illustrated. In addition, a characteristic 1001 of the maximum speed is illustrated.

Figure 3:
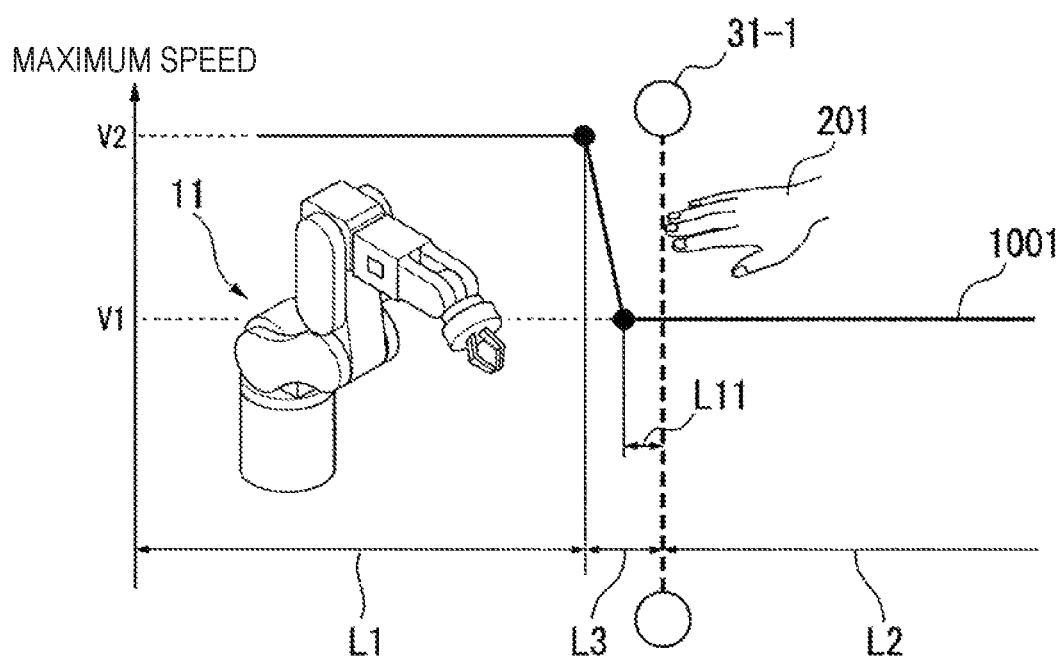
FIG. 3 is a diagram illustrating an example of the maximum speed for each region and images of a robot, a first object detector, and a human (a hand of a human) according to the embodiment (first embodiment) of the invention.

FIG. 3 is a diagram illustrating an example of the maximum speed for each region and images of the robot 11, the first object detector 31-1, and a human (a hand of a human) 201 according to the embodiment (first embodiment) of the invention.

In FIG. 3, the horizontal axis represents ranges of the regions, respectively. The vertical axis represents the maximum speeds in the regions, respectively.

Specifically, a range L1 of the high-speed region R1, a range L2 of the low-speed region R2, a range L3 of the maximum-speed-change region R3, and a range L11 in which the maximum speed in the maximum-speed-change region R3 is a safety speed are illustrated. In addition, a characteristic 1001 of the maximum speed is illustrated. In addition, the robot 11, the human 201 (in FIG. 3, the hand of the human), and the first object detector 31-1 are illustrated. The human 201 may be a person (operator) or the like who performs work related to the robot 11.

The robot 11 has the maximum speeds of a constant speed V2 (V2 is a value larger than 0) in the range L1 of the high-speed region R1, and a constant speed V1 (V1 having a value which is larger than 0 and smaller than V2) as the safety speed in the range L2 of the low-speed region R2. In addition, the robot 11 has the maximum speeds of the constant speed V1 as the safety speed in the range L11 in which the maximum speed is the safety speed in the maximum-speed-change region R3, and a speed between the speed V2 and the speed V1 in another range (range in the range L3 other than the range L11).

As described above, in the embodiment, in the robot 11 including the movable unit that is movable in the high-speed region R1 and the low-speed region R2, a speed of a predetermined portion, which is obtained in a case where a predetermined portion of the movable unit is positioned within the low-speed region R2, is not 0 and is limited to a speed lower than the maximum speed of the predetermined portion in a case where the predetermined portion is positioned within the high-speed region R1.

Limitation on Speed of Actuation of Robot Due to Invasion of Object

In the embodiment, in a case where detection that the object (in an example in FIG. 3, a human 201) enters the maximum-speed-change region R3 from the low-speed region R2 is performed, based on the information input from the first object detector 31-1, the control unit 104 limits the speed of the actuation of the robot 11 by the robot controller 131 to the safety speed (in the example in FIG. 3, the speed V1) or a speed lower than the safety speed. Here, it is normal to take a time (in this description, referred to as a "delay time") from the invasion of the object to a point when the speed of the actuation of the robot 11 reaches the safety speed.

In the embodiment, a speed at which the object (in the example in FIG. 3, the human 201) moves is assumed to be a predetermined value, and a distance in which the object moves during the delay time is calculated. In the example in FIG. 3, a range, in which a distance corresponding to the distance is obtained, is set as the range L11 in which the maximum speed in the maximum-speed-change region R3 is the safety speed. The range L11 continues to reach the range L2 of the low-speed region R2. In the example in FIG. 3, a position, at which the robot 11 can most approach the object when the delay time elapses, is illustrated. As described above, in the embodiment, a movement speed of the object (in the example in FIG. 3, the human 201) and a reaction speed of the robot 11 related to the first object detector 31-1 are considered.

As described above, in the embodiment, the control unit 104 is capable of controlling the speed of the actuation of the robot 11, based on the information input from the first object detector 31-1.

Here, the position, at which the robot 11 can most approach the object, is obtained, based on a distance between the object and a predetermined portion of the robot 11. In this case, any portion may be used as the predetermined portion of the robot 11 which is used to obtain the distance between the object and the robot 11.

As an example, the closest portion (that is, a portion at the smallest distance to the object) of the movable unit of the robot 11 may be used as the portion of the robot 11 that is used to obtain the distance. In this case, the control unit 104 identifies the portion during the actuation of the robot 11.

As another example, a portion, which is set in a fixed manner in advance, may be used as the portion of the robot 11 which is used to obtain the distance. In this case, the portion is set in the control device 12 in advance.

In addition, in a case where the control unit 104 controls the robot 11, as an example, the control unit is capable of identifying a position and a posture of the predetermined portion of the movable unit, based on information of a position at which the base B1 of the robot 11 is installed and information of a position and a posture of the movable unit of the robot 11, thereby being capable of calculating a distance between a predetermined object and the predetermined portion of the movable unit. In the embodiment, information relating to a mechanical structure of the base B1 and the movable portion of the robot 11 is stored in the control device 12, and the control unit 104 is capable of identifying the position and the posture of the predetermined portion of the movable unit, based on the information.

As another example, a sensor that detects the position or the posture of the movable unit of the robot 11 may be installed outside the robot 11. In this case, the control unit 104 is capable of identifying the position and the posture of the predetermined portion of the movable unit, based on information of detection results by the sensor, thereby being capable of calculating a distance between a predetermined object and the predetermined portion of the movable unit.

The portion of the robot 11, of which the position and the posture are identified, and the portion, of which the speed is detected, maybe the same portion, or maybe different portions.

Stopping of Actuation of Robot Due to External Force

In the embodiment, in a case where an external force having a predetermined threshold value or larger is detected, the control unit 104 stops the actuation of the robot 11 by the robot controller 131, based on the information input from the force detector 22. Any value may be used as the threshold value.

As described above, in the embodiment, the control unit 104 is capable of controlling the speed of the actuation of the robot 11, based on the information input from the force detector 22.

Limitation on Actuation of Robot Due to External force and Invasion of Object

In the embodiment, both of the limitation on the speed of the actuation of the robot 11 in response to the invasion of the object and the stopping of the actuation of the robot 11 in response to the external force having the predetermined threshold value or larger are performed.

As described above, in the embodiment, the control unit 104 is capable of controlling the speed of the actuation of the robot 11, based on the information input from the first object detector 31-1 and the information input from the force detector 22.

In the embodiment, in a case where the first object detectors 31-1 to 31-4 do not detect the invasion of the object, and in a case where the force detector 22 does not detect an external force having the predetermined threshold value or larger, a state is as follows. In other words, in this case, the robot 11 is capable of being actuated at the maximum speed (in the example in FIG. 3, the speed V2) or a speed lower than the maximum speed in the high-speed region R1, is capable of being actuated at a speed (in the example in FIG. 3, a speed of the characteristic 1001 that is higher than or equal to the speed V1 and lower than the speed V2) limited depending on a position, or a speed lower than the limited speed in the maximum-speed-change region R3, and is capable of being actuated at the safety speed (in the example in FIG. 3, the speed V1) or a speed lower than the safety speed in the low-speed region R2.

In the embodiment, the upper limit of the speed in the high-speed region R1 is the maximum speed (here, the maximum speed as the specification); however, this corresponds to that the upper limit of the speed is not set by control other than the specification in practice.

In the embodiment, in a case where the first object detectors 31-1 to 31-4 detect the invasion of the object, and in the case where the force detector 22 does not detect an external force having the predetermined threshold value or larger, a state is as follows. In other words, in this case, the robot 11 is capable of being actuated at the safety speed or a speed lower than the safety speed in all of the regions (the high-speed region R1, the maximum-speed-change region R3, and the low-speed region R2).

In the embodiment, in the case where the first object detectors 31-1 to 31-4 do not detect the invasion of the object, and in a case where the force detector 22 detects an external force having the predetermined threshold value or larger, a state is as follows. In other words, in this case, the robot 11 stops in all of the regions (the high-speed region R1, the maximum-speed-change region R3, and the low-speed region R2).

In the embodiment, in the case where the first object detectors 31-1 to 31-4 detect the invasion of the object, and in the case where the force detector 22 detects an external force having the predetermined threshold value or larger, a state is as follows. In other words, in this case, the robot 11 stops in all of the regions (the high-speed region R1, the maximum-speed-change region R3, and the low-speed region R2).

In the embodiment, the robot 11 is capable of being actuated and performing work in all of the regions of the high-speed region R1, the low-speed region R2, and the maximum-speed-change region R3.

In the embodiment, information (in the example in FIG. 3, information of the speed represented by the characteristic 1001) of the allowed maximum speed is set for each region (the high-speed region R1, the low-speed region R2, or the maximum-speed-change region R3). As an another example of a configuration, an allowed constant speed may be set for each region (the high-speed region R1, the low-speed region R2, or the maximum-speed-change region R3), or a speed of the robot 11 may be set to be constant for each region (depending on a position in the maximum-speed-change region R3).

Description of Comparative Technology

Figure 17:
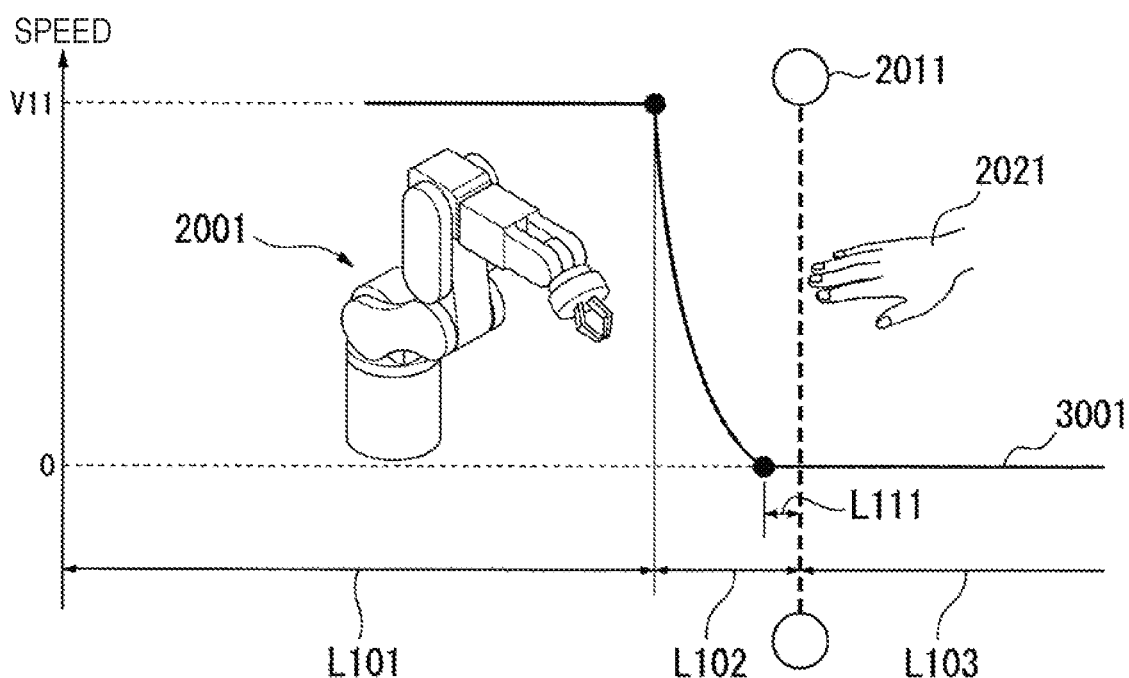
FIG. 17 is a diagram illustrating an example of a speed for each region according to comparative technology.

FIG. 17 is a diagram illustrating an example of a speed for each region according to comparative technology.

The comparative technology illustrated in FIG. 17 is technology compared to technology of the embodiment illustrated in FIG. 3, and, for example, is the background technology.

In FIG. 17, the horizontal axis represents ranges of the regions, respectively. The vertical axis represents speeds in the regions, respectively.

Specifically, a range L101 of a first region, a range L102 of a second region, and a range L103 of a third region are illustrated. In addition, a characteristic 3001 of the speed is illustrated. In addition, a robot 2001, a human 2021 (in FIG. 17, a hand of the human), and an object detector 2011 are illustrated.

In an example in FIG. 17, a virtual safety fence is assumed to be present on a boundary between the range L102 of the second region and the range L103 of the third region, and the object detector 2011 detects invasion of the object (in the example in FIG. 17, the human 2021) on the boundary. The robot 2001 is capable of performing actuation at the maximum speed in the range L101 of the first region; however, the robot performs free running in the range L102 of the second region, and the robot is assumed not to perform the actuation in the range L103 of the third region.

A speed of the robot 2001 is a speed V11 (V11 having a value which is larger than 0) as the maximum speed in the range L101 of the first region and is 0 in the range L103 of the third region.

Here, in a case where the object detector 2011 detects the object (in the example in FIG. 17, the human 2021) enters the range L102 of the second region from the range L103 of the third region, the speed of the actuation of the robot 2001 is controlled to 0 (that is, a state in which the robot 2001 stops). Here, it is normal to take a time (in this description, referred to as the "delay time") from the invasion of the object to a point when the speed of the actuation of the robot 2001 reaches 0.

Therefore, a speed at which the object (in the example in FIG. 17, the human 2021) moves is assumed to be a predetermined value, and a distance in which the object moves during the delay time is calculated. In the example in FIG. 17, a range, in which a distance corresponding to the distance is obtained, is set as a range L111. The range L111 continues to reach the range L103 of the third region.

Here, a distance of a range other than the range L111 in the range L102 of the second region is a free running distance. In the free running distance, the robot 2001 performs the free running from the maximum speed and stops. For example, a characteristic of a speed change representing the free running is a characteristic that accidentally occurs, and can be different for each circumstance at the time of the occurrence.

As described above, in the example in FIG. 17, in order to ensure the stop of the robot 2001 on the inner side of the virtual safety fence in the case where the invasion of the object is detected, the free running distance is set. In this case, since the free running distance is considered, regardless of an occurrence of the invasion of the object, a region in which the robot 2001 can be actuated at the maximum speed is narrowed.

Expansion and Reduction of Region

Expansion or reduction of the region is described with reference to FIGS. 4 and 5.

Figure 4:
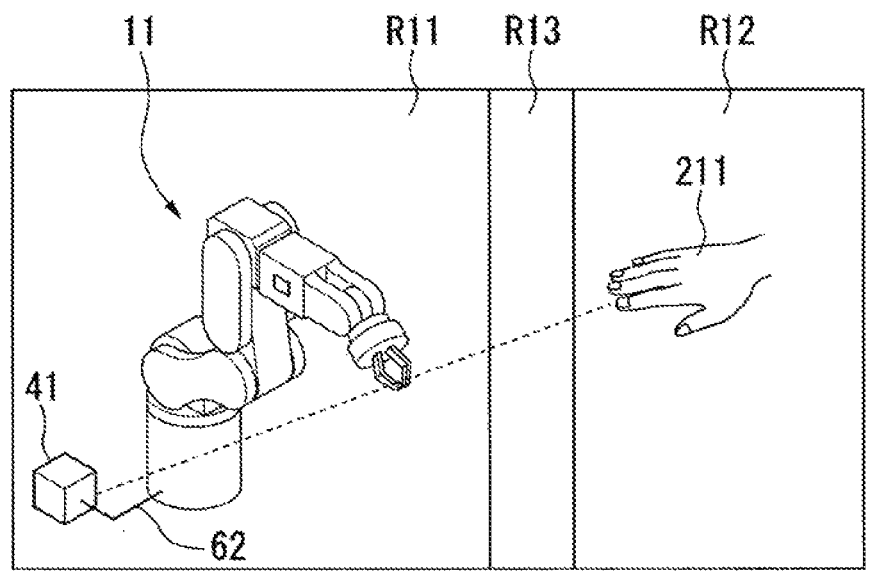
FIG. 4 is a diagram illustrating an example of expansion and reduction of a region according to the embodiment (first embodiment) of the invention.
Figure 5:
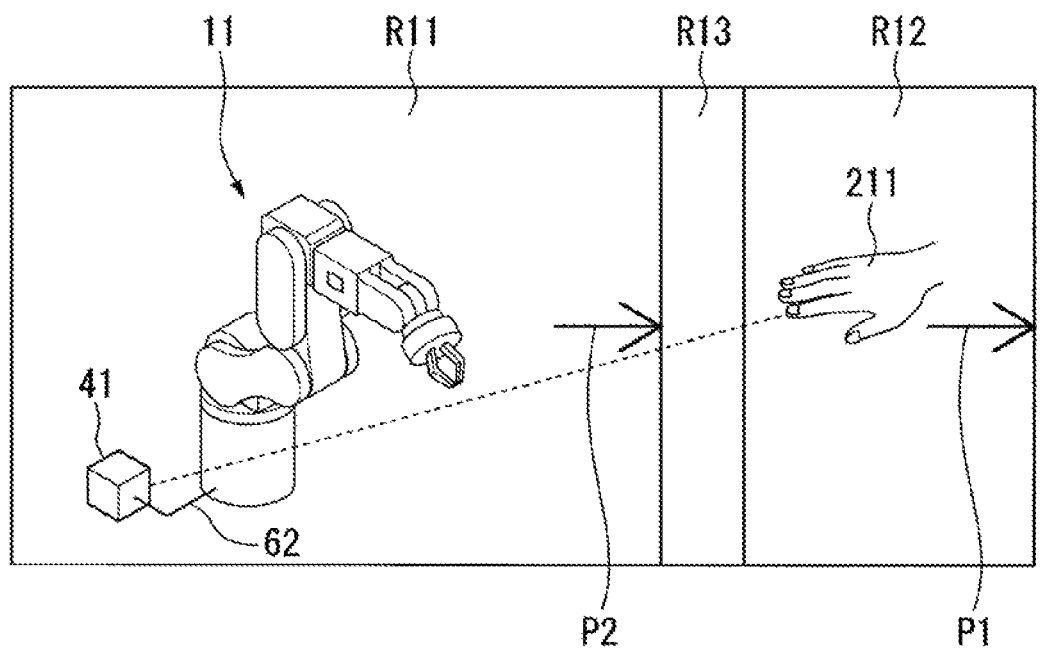
FIG. 5 is a diagram illustrating an example of expansion and reduction of the region according to the embodiment (first embodiment) of the invention.

FIGS. 4 and 5 are diagrams illustrating an example of the expansion and reduction of the region according to the embodiment (first embodiment) of the invention.

FIG. 4 illustrates an example of the robot 11, a human 211 (an example of the object), a high-speed region R11 (region corresponding to the high-speed region R1 illustrated in FIG. 1), a low-speed region R12 (region corresponding to the low-speed region R2 illustrated in FIG. 1), and a maximum-speed-change region R13 (region corresponding to the maximum-speed-change region R3 illustrated in FIG. 1). In addition, the second object detector 41 connected to the control device 12 via the cable 62 is illustrated.

FIG. 5 illustrates an example of the robot 11, the human 211, the high-speed region R11, the low-speed region R12, and the maximum-speed-change region R13. In addition, an example of a direction P1, in which the human 211 moves, and an example of a direction P2, in which the high-speed region R11 changes, are illustrated. In addition, the second object detector 41 connected to the control device 12 via the cable 62 is illustrated.

Here, the control unit 104 determines the direction P1 and a movement amount by which the human 211 moves, based on detection results (information of a distance related to the human 211) by the second object detector 41. As illustrated in FIG. 5, the control unit 104 performs a change to the direction P2 in which the high-speed region R11 is expanded, in a case where the human 211 moves in the direction P1 in which the human is apart from the robot 11. In this case, the control unit 104 determines an amount (change amount) by which the high-speed region R11 is changed in response to the movement amount of the human 211. A relationship between the movement amount of the human 211 and the change amount of the high-speed region R11 may be arbitrary, for example, may be a proportional relationship, or may be another relationship.

In addition, FIGS. 4 and 5 illustrate a case where the high-speed region R11 is expanded. Similarly, the high-speed region R11 may be reduced. For example, the control unit 104 performs a change to a direction in which the high-speed region R11 is reduced, in a case where the human 211 moves in a direction in which the human approaches the robot 11.

As described above, the control unit 104 expands the high-speed region R11 in a case where the human 211 is present to be far apart from the robot 11, and reduces the high-speed region R11 in a case where the human 211 is present to be close to the robot 11.

Here, any technique for determining whether the direction, in which the human 211 moves, is a direction in which the human moves away from the robot 11, or the direction is a direction in which the human approaches the robot 11 may be employed. As an example, a technique for determining that the direction is a direction in which the human moves away from the robot 11 in a case where a distance between a position (or a position as another reference) of the robot 11 and a position of the human 211 increases, and determining that the direction is a direction in which the human approaches the robot 11 in a case where the distance decreases may be used. In this case, as the position of the robot 11, for example, the position of the base B1 of the robot 11 may be used, or, a position of another portion of the robot 11 may be used.

In addition, the control unit 104 may change the high-speed region R11, depending on the distance between the position (or a position as another reference) of the robot 11 and the position of the human 211. For example, the control unit 104 may change the high-speed region R11 to a maximum region required for work by the robot 11 in a case where the distance exceeds a predetermined threshold value. The maximum region may be arbitrarily set, or, for example, may be set in advance.

In addition, as another example of such a configuration, the control unit 104 may remove the maximum-speed-change region R13 (region as a margin) such that the high-speed region R11 may be expanded with the maximum-speed-change region R13 contained into the high-speed region R11, in the case where the distance exceeds a predetermined threshold value.

As described above, in the embodiment, the high-speed region R11 of the robot 11 is changed depending on a circumstance of the object (in the example in FIG. 4, the human 211) that is present in the periphery of the robot 11, and thereby it is possible to ensure the expansion of the region in which the robot 11 is capable of being actuated at a high speed.

In a case where a plurality of different objects (in the example in FIG. 4, the human 211) are present on the periphery of the robot 11, for example, the control unit 104 may change the high-speed region R11 with an object (the closest object) having the shortest distance to the position (or a position as another reference) of the robot 11, as a reference.

Circumstance in which a Plurality of Robot is Present

A circumstance in which a plurality of robots 11-1 to 11-m (m is an integer of 2 or larger) are present is described.

Figure 6:
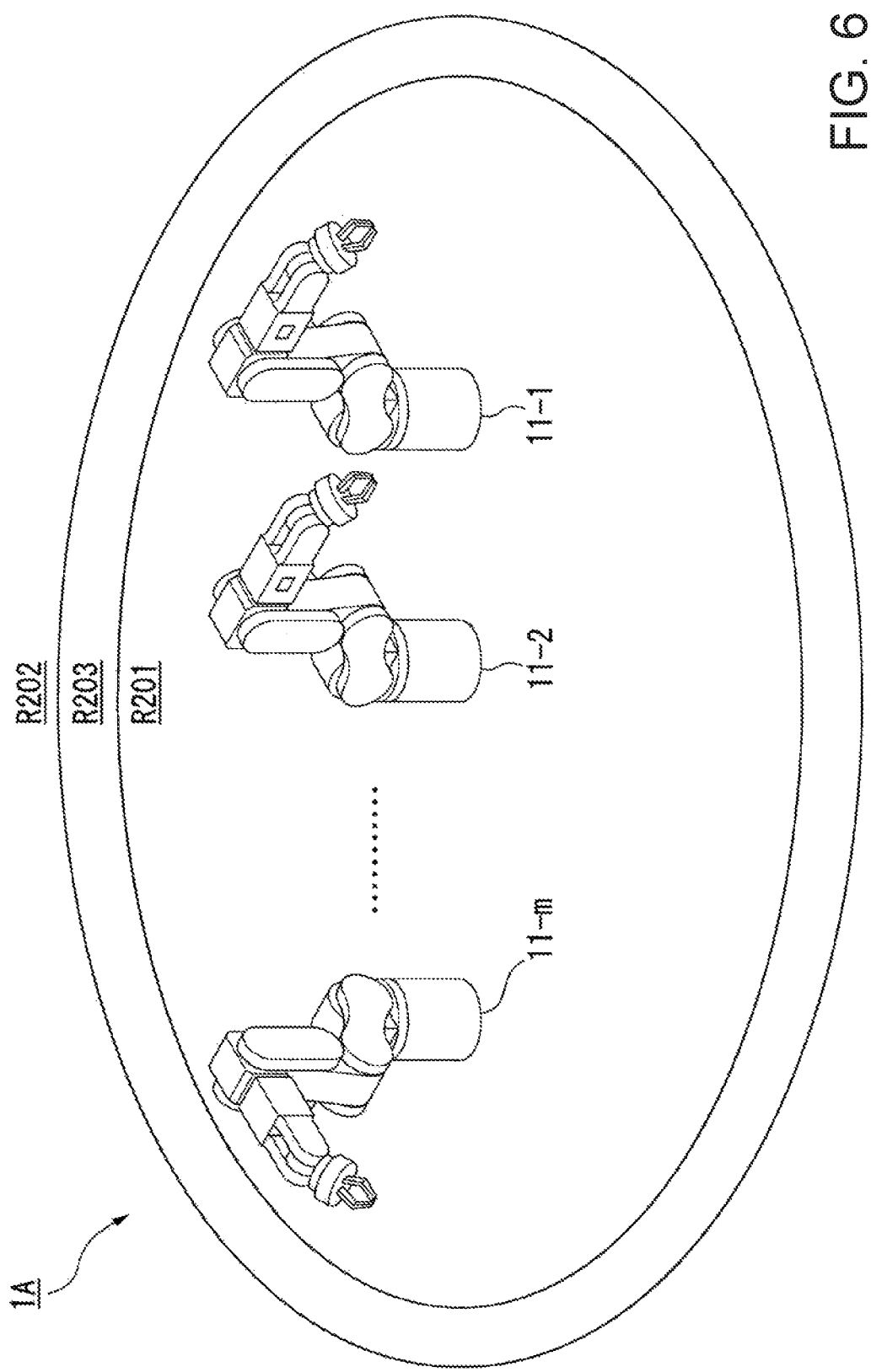
FIG. 6 is a diagram illustrating an example of a circumstance in which a plurality of robots are present according to the embodiment (first embodiment) of the invention.

FIG. 6 is a diagram illustrating an example of the circumstance in which the plurality of robots 11-1 to 11-m are present according to the embodiment (first embodiment) of the invention.

FIG. 6 illustrates an example of a schematic configuration of a robot system 1A including the plurality of robots 11-1 to 11-m, a high-speed region R201 (region corresponding to the high-speed region R1 illustrated in FIG. 1), a low-speed region R202 (region corresponding to the low-speed region R2 illustrated in FIG. 1), and a maximum-speed-change region R203 (region corresponding to the maximum-speed-change region R3 illustrated in FIG. 1).

Here, the configuration of the robot system 1A is schematically similar to the configuration of the robot system 1 illustrated in FIG. 1 except that the plurality of robots 11-1 to 11-m having the same function as that of the robot 11 illustrated in FIG. 1 are present.

In the example in FIG. 6, a region containing bases of the plurality of robots 11-1 to 11-m is set as the high-speed region R201. The maximum-speed-change region R203 exists outside the high-speed region R201, and the low-speed region R202 exists outside the maximum-speed-change region R203.

Here, a boundary between the high-speed region R201 and the maximum-speed-change region R203 is set in consideration of presence of the plurality of robots 11-1 to 11-m. As an example, the high-speed region R201 may be set to have a shape (for example, a similar shape), which is formed, depending on a shape of disposition of the plurality of robots 11-1 to 11-m. In the example in FIG. 6, the plurality of robots 11-1 to 11-m are disposed to be aligned to have a straight line shape in a row, and the high-speed region R201 is set to have an elliptic shape similar to the shape of the disposition.

In addition, the boundary between the maximum-speed-change region R203 and the low-speed region R202 may be determined, for example, with one robot closest to the boundary of the plurality of robots 11-1 to 11-m as a reference. As an example, in the case where the plurality of robots 11-1 to 11-m are aligned to have a straight line shape, a boundary in the vicinity of one end may be determined with the robot 11-1 on the one end as a reference. Similarly, a boundary in the vicinity of the other end may be determined with the robot 11-m on the other end as a reference.

In the example in FIG. 6, a boundary between the maximum-speed-change region R203 and the low-speed region R202 has the elliptical shape similar to the shape of the boundary between the high-speed region R201 and the maximum-speed-change region R203.

Conclusion of First Embodiment

As described above, in the robot system 1 according to the embodiment, the actuation of the robot 11 may not stop even outside the high-speed region R1, or it is possible to perform the actuation of the robot 11 in all of the regions (the high-speed region R1, the maximum-speed-change region R3, and the low-speed region R2). In this manner, in the robot system 1 according to the embodiment, it is possible to perform the actuation at at least the safety speed so as to continue the minimum work even outside the high-speed region R1, and to prevent lowering of the work efficiency.

In the robot system 1 according to the embodiment, for example, it is possible to narrow the occupation area of the robot 11 while productivity is maintained by the actuation of the robot 11 to the largest extent in an environment in which the robot 11 and the human (or another matter) coexist.

Specifically, in the embodiment, the configuration, in which the speed of the robot is reduced from the maximum speed to 0 through the free running, is not employed, but the configuration, in which the speed of the robot 11 is reduced from the maximum speed to a speed (for example, the safety speed) other than 0, is employed. Therefore, compared to a case where the free running is used, a time taken to change the speed from the maximum speed to a speed (in the embodiment, the safety speed) after the reduction is shortened. Therefore, in the embodiment, it is possible to narrow the maximum-speed-change region R3, and it is possible to narrow the occupation area (for example, an area of a region obtained by combining the high-speed region R1 and the maximum-speed-change region R3) of the robot 11. For example, in a case where the robot 11 performs the same work, compared to the configuration of using the free running, the occupation area of the robot 11 is narrowed and it is possible to increase efficiency of the work, in the embodiment.

Compared to the configuration of using the free running, in a case where the occupation area of the robot 11 is the same, it is possible to expand the high-speed region R1 and it is possible to increase efficiency of the work, in the embodiment.

Here, in the embodiment, the case where the base B1 of the robot 11 is installed is described; however, as another example of the configuration, a configuration in which the base B1 of the robot 11 can move may be used. As an example, the robot 11 (including the base B1) maybe caused to move by being mounted on a table or the like.

In a case where the second object detector 41 and the robot 11 (including the base B1) are provided separately from each other, and thus the robot 11 is capable of moving, for example, the second object detector 41 and the robot 11 may have a function of detecting a relative positional relationship (for example, a movement amount of the robot 11) between the second object detector 41 and the robot 11, the control unit 104 may correct information of detection results by the second object detector 41, based on the positional relationship, and thereby a change in the positional relationship may be compensated.

In addition, in the embodiment, the case where the base B1 of the robot 11 is positioned within the high-speed region R1 is illustrated in the example in FIG. 1; however, as another example of the configuration, the base B1 of the robot 11 may be positioned outside the high-speed region R1.

In addition, in the embodiment, the case where all of the bases of the plurality of robots 11-1 to 11-m are positioned within the high-speed region R201 is illustrated in the example in FIG. 6; however, as another example of the configuration, one or more bases of the plurality of robots 11-1 to 11-m may be positioned outside the high-speed region R201.

Second Embodiment

Robot System

In the embodiment, an example of a configuration of having an additional function is described in the same configuration as that of the robot system 1 illustrated in FIG. 1.

In the embodiment, the description of the same configuration and actuation as that of the robot system 1 illustrated in FIG. 1 is simplified or omitted.

Hereinafter, differences in configurations and actuation from those of the robot system 1 illustrated in FIG. 1 are described in detail.

Display Unit Provided in Robot

Figure 7:
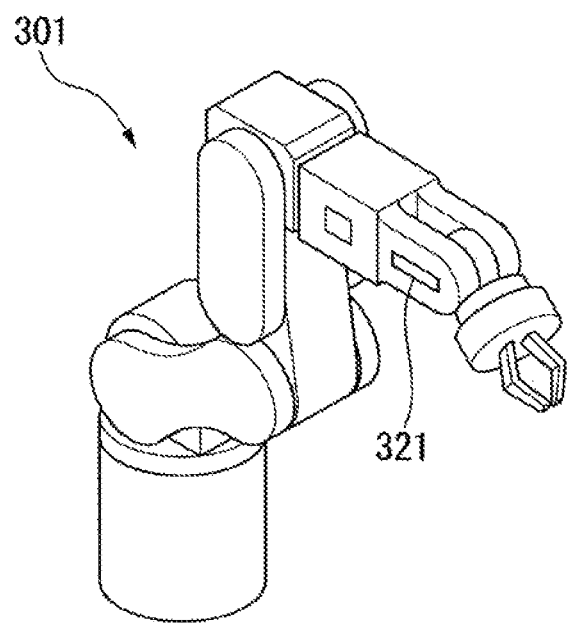
FIG. 7 is a diagram schematically illustrating an example of a configuration of a robot according to another embodiment (second embodiment) of the invention.

FIG. 7 is a diagram schematically illustrating an example of a configuration of a robot 301 according to another embodiment (second embodiment) of the invention.

The robot 301 further includes a display unit 321, in addition to the same configuration as that of the robot system 11 illustrated in FIG. 1.

In the example in FIG. 7, the display unit 321 is provided on a side surface of an arm (or one that maybe referred to as a link) on the most distal end of the manipulator of the robot 301. In such an example in FIG. 7, the display unit 321 is provided in a portion close to the end effector; however, in another example of such a configuration, the display unit may be provided in any portion. As another example of the configuration, the display unit 321 may be provided separately from the robot 301.

The control device 12 and the display unit 321 are connected to be capable of communicating with each other via a wired cable (not illustrated) or wirelessly.

The output unit 102 of the control device 12 outputs information to the display unit 321 such that the display unit 321 displays and outputs the information. The display unit 321 is, for example, a display device having a screen, and displays and outputs information on the screen.

For example, the display unit 121 illustrated in FIG. 2 maybe configured as the display unit 321 illustrated in FIG. 7, or may be provided separately from the display unit 321 illustrated in FIG. 7.

The control unit 104 of the control device 12 determines a distance between a position (for example, a position as another reference) of the robot 301 and a position of the object (for example, a human), based on information of the detection results by the second object detector 41. The control unit 104 outputs, to the display unit 321, information obtained according to the determined distance. As the information according to the distance, any type of information may be used, information of color is used in the embodiment; however, as an another example of the configuration, information of characters or images may be used as the information according to the distance.

The information displayed by the display unit 321 is an indicator indicating the distance.

In the embodiment, the control unit 104 compares magnitude relationships between the determined distance and one or more threshold values, respectively, and outputs, to the display unit 321, information for indicating a color according to the distance, based on the magnitude relationships between the distance and the threshold value.

Figure 8:
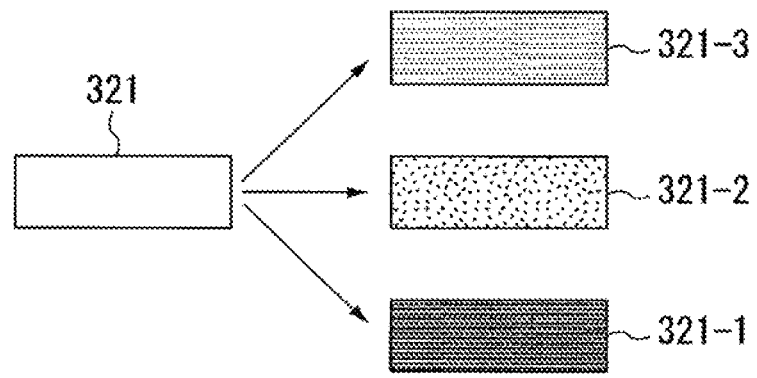
FIG. 8 is a diagram illustrating an example of a display on a display unit according to the embodiment (second embodiment) of the invention.

FIG. 8 is a diagram illustrating an example of a display on the display unit 321 according to the embodiment (second embodiment) of the invention.

In the example in FIG. 8, in a case where the determined distance exceeds a first threshold value (the threshold value as a value larger than 0), the control unit 104 displays information 321-1 of the green color (or the blue color) by the display unit 321 in order to indicate the safety. In a case where the determined distance is smaller than or equal to the first threshold value and exceeds a second threshold value (the threshold value as a value that is larger than 0 and smaller than the first threshold value), the control unit 104 displays information 321-2 of the yellow color by the display unit 321 in order to indicate a caution. In a case where the determined distance is smaller than or equal to the second threshold value, the control unit 104 displays information 321-3 of the red color by the display unit 321 in order to indicate an urgent caution. In this manner, the color displayed on the single display unit 321 changes according to the distance.

The number of threshold values may be arbitrarily selected, or the number (types) of colors displayed on the display unit 321 may be arbitrarily selected.

In addition, the corresponding relationship between the distance and the color may be arbitrarily selected.

Figure 9:
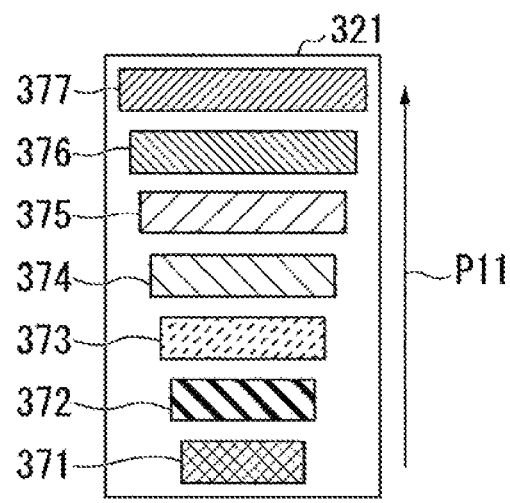
FIG. 9 is a diagram illustrating an example of a display on the display unit according to the embodiment (second embodiment) of the invention.

FIG. 9 is a diagram illustrating an example of a display on the display unit 321 according to the embodiment (second embodiment) of the invention.

In an example in FIG. 9, the control unit 104 compares the magnitude relationships between the determined distances and six different threshold values and determines whether the distance is included in any of seven distance ranges which are divided by using the threshold values. The control unit 104 displays, by the display unit 321, the information of the color according to the distance range including the distance.

In the example in FIG. 9, numbers of 1 to 7 are assigned to the seven distance ranges, in order from a side on which the distance included in the distance range is large to a side on which the distance is small. The control unit 104 displays, by the display unit 321, the number of items of information 371 to 377 corresponding to the determined distance ranges. In other words, the control unit 104 displays one item of information 371 by the display unit 321 in a case where the determined distance range is most apart (most apart), displays two items of information 371 and 372 by the display unit 321 in a case where the determined distance range is second most apart, hereinafter, performs in the same manner, and displays seven items of information 371 to 377 by the display unit 321 in a case where the determined distance range is closest (seventh most apart). In other words, the control unit 104 displays i items of information by the display unit 321 in a case where the determined distance range is i-th (i=1, 2, 3, 4, 5, 6, and 7) most apart. In this manner, a level of a level meter displayed on the single display unit 321 changes according to the distance. In the example in FIG. 9, the level increases as the level of the level meter increases in the direction P11.

Here, the items of information 371 to 377 are information of linear figures, and a length of the linear shape increases from the information 371 to the information 377. In the example in FIG. 9, the number of the linear figures corresponds to the levels of the level meter. For example, bar-shaped figures or rectangular figures may be used as the linear figures.

In addition, the items of information 371 to 377 may be the same color, or may be different colors from each other. In addition, the items of information 371 to 377 are the same color; however, the information changes according to the numbers displayed on the display unit 321.

For example, the display content of the display unit 321 is the level meter, the distance may be displayed according to an increase or a decrease in the number of the same color, or the distance may be displayed according to an increase or a decrease in the number of the different colors.

The number of threshold values (the number of distance ranges) may be arbitrarily selected, or the number (types) of colors displayed on the display unit 321 may be arbitrarily selected.

In addition, the corresponding relationship between the distance ranges and the colors may be arbitrarily selected.

Configuration of Including Lighting Unit

Figure 10:
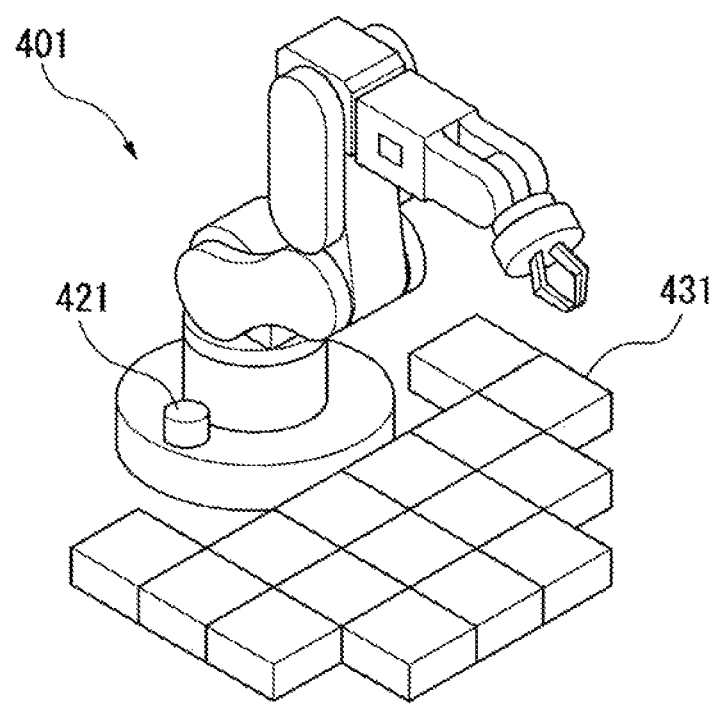
FIG. 10 is a diagram illustrating an example of a configuration in which a lighting unit is provided on the periphery of the robot according to the embodiment (second embodiment) of the invention.

FIG. 10 is a diagram illustrating an example of a configuration in which a lighting unit 431 (an example of the display unit) is provided on the periphery of a robot 401 according to the embodiment (second embodiment) of the invention.

FIG. 10 illustrates the robot 401 similar to the robot 11 illustrated in FIG. 1, a second object detector 421 provided on the periphery of the robot 401, and a plurality of lighting units (in the example in FIG. 10, a reference sign is assigned to only one lighting unit 431).

In the example in FIG. 10, a laser rangefinder or a laser scanner that measures (detects) the distance may be used as the second object detector 421.

For example, the robot 401 may include the same display unit as the display unit 321 illustrated in FIG. 7.

The plurality of lighting units 431 are disposed on the periphery of a movable range of the robot 401. The lighting units 431 have a tile shape (for example, a plate shape having a square shape or a rectangular shape), and are disposed to be laid in a corresponding portion of a floor.

In the embodiment, the plurality of lighting units 431 can be freely disposed in layout to have any shape.

The control device 12 and the lighting units 431 are connected to be capable of communicating with each other via a wired cable (not illustrated) or wirelessly.

The output unit 102 of the control device 12 outputs a signal to the lighting units 431, and the lighting units 431 turns on light of a color in response to the signal.

The control unit 104 of the control device 12 determines a distance between a position (for example, a position as another reference) of the robot 401 and a position of the object (for example, a human), based on information of the detection results by the second object detector 41. The control unit 104 turns on, by the lighting units 431, light of colors according to the determined distance. In this manner, the color displayed by the lighting units 431 changes according to the distance.

Here, in the embodiment, in a case where the plurality of lighting units 431 are connected to one another, a configuration in which communication of a signal is performed between the plurality of lighting units 431 may be used. In this manner, in the embodiment, at least one lighting unit 431 may be connected to the control device 12 to be capable of communicating with the control device.

As another example of the configuration, the plurality of lighting units 431 may all be connected to the control device 12 to be capable of communicating with the control device, and the control device 12 may impart a signal for each of the lighting units 431.

Figure 11:
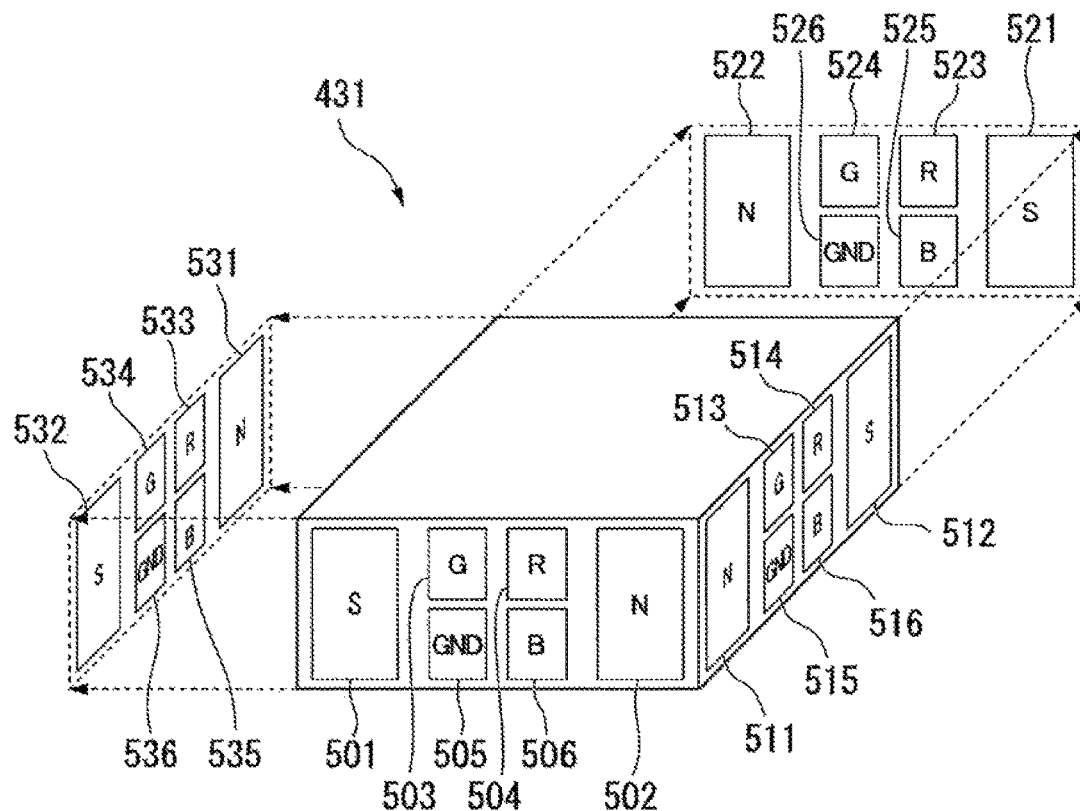
FIG. 11 is a diagram schematically illustrating an example of a configuration of the lighting unit according to the embodiment (second embodiment) of the invention.

FIG. 11 is a diagram schematically illustrating an example of a configuration of the lighting unit 431 according to the embodiment (second embodiment) of the invention. In the embodiment, configurations and actuation of the plurality of lighting units 431 are the same and are collectively described.

The lighting unit 431 has a surface (front surface) on the front surface side and a surface (back surface) on the back surface side, and has four surfaces (side surfaces) on the side surface sides with respect to the front surface and the back surface in a case where the lighting unit is disposed on a surface of the floor or the like. The two different lighting units 431 are connected with the side surfaces abutting each other, and similarly, a group of multiple lighting units 431 connected to each other is formed.

In the embodiment, a lighting device is provided inside the lighting unit 431 in a configuration in which it is possible to recognize light when viewed from the front surface side of the lighting unit 431.

A first side surface of the lighting unit 431 is provided with a magnet portion 501 provided with a side of the S pole of a magnet (for example, a permanent magnet), a magnet portion 502 provided with a side of the N pole of a magnet (for example, a permanent magnet), a terminal 503 corresponding to green (G), a terminal 504 corresponding to red (R), a terminal 505 corresponding to the ground (GND), and a terminal 506 corresponding to blue (B).

A second side surface of the lighting unit 431 is provided with a magnet portion 511 provided with a side of the N pole of a magnet (for example, a permanent magnet), a magnet portion 512 provided with a side of the S pole of a magnet (for example, a permanent magnet), a terminal 513 corresponding to green (G), a terminal 514 corresponding to red (R), a terminal 515 corresponding to the ground (GND), and a terminal 516 corresponding to blue (B).

A third side surface of the lighting unit 431 is provided with a magnet portion 521 provided with a side of the S pole of a magnet (for example, a permanent magnet), a magnet portion 522 provided with a side of the N pole of a magnet (for example, a permanent magnet), a terminal 523 corresponding to red (R), a terminal 524 corresponding to green (G), a terminal 525 corresponding to blue (B), and a terminal 526 corresponding to the ground (GND).

A fourth side surface of the lighting unit 431 is provided with a magnet portion 531 provided with a side of the N pole of a magnet (for example, a permanent magnet), a magnet portion 532 provided with a side of the S pole of a magnet (for example, a permanent magnet), a terminal 533 corresponding to red (R), a terminal 534 corresponding to green (G), a terminal 535 corresponding to blue (B), and a terminal 536 corresponding to the ground (GND).

The two magnet portions 501 and 502, 511 and 512, 521 and 522, and 531 and 532 are disposed by one in the vicinity of a boundary between adjacent two different side surfaces on the side surfaces, respectively.

In addition, four terminals 503 to 506, 513 to 516, 523 to 526, and 533 to 536 are disposed between the two magnet portions 501 and 502, 511 and 512, 521 and 522, and 531 and 532 on the side surfaces, respectively.

In addition, the positions of the two magnet portions and the positions of the four terminals are disposed at the same positions on the four side surfaces.

In addition, a sheet-shaped magnet may be used as the magnet.

In a case of using the plurality of lighting units 431 having a configuration illustrated in FIG. 11, the S pole and the N pole are opposite (opposite magnetic poles) to each other in the two adjacent lighting units 431, and the side surfaces are connected to each other in disposition in which the green (G), the red (R), the blue (B), and the ground (GND) match each other. This connection is realized due to the magnetic force of the magnet.

In the lighting unit 431, the magnet portions 501 and 502, 511 and 512, 521 and 522, and 531 and 532 and terminals 503 to 506, 513 to 516, 523 to 526, and 533 to 536 may be disposed in another disposition.

Figure 12:
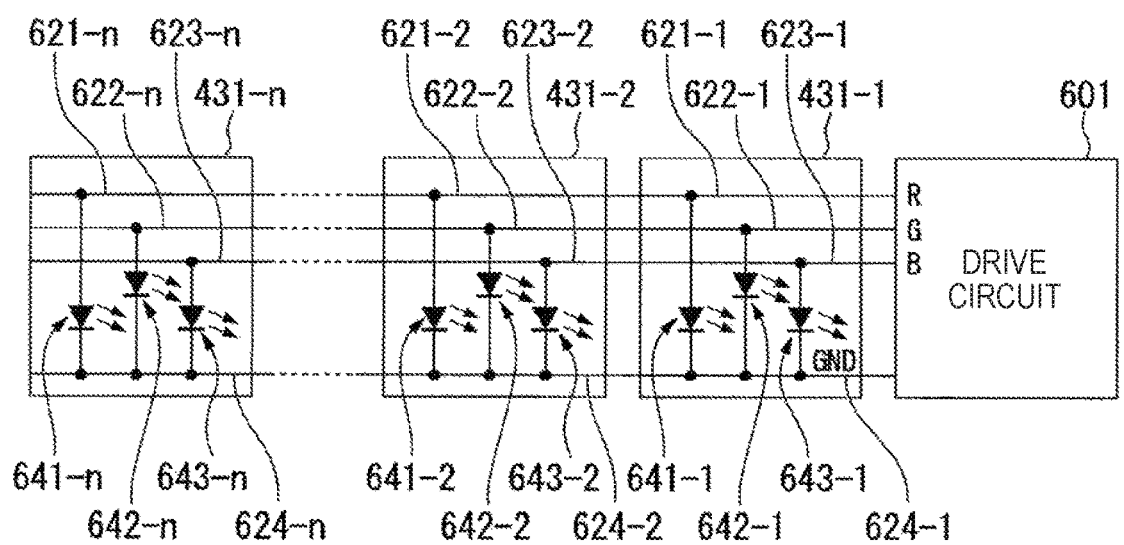
FIG. 12 is a diagram schematically illustrating an example of a configuration of a circuit of the lighting unit according to the embodiment (second embodiment) of the invention.

FIG. 12 is a diagram schematically illustrating an example of a configuration of a circuit of the lighting unit 431 according to the embodiment (second embodiment) of the invention.

FIG. 12 illustrates a drive circuit 601 and the plurality of lighting units 431-1 to 431-n (n is an integer of 2 or larger).

In the example of FIG. 12, the drive circuit 601 and the plurality of lighting units 431-1 to 431-n are connected in series.

A configuration and actuation of the lighting units 431-1 to 431-n are the same as the lighting unit 431 illustrated in FIG. 11.

The first lighting unit 431-1 may be provided with a signal line 621-1 corresponding to the red (R), a signal line 622-1 corresponding to the green (G), a signal line 623-1 corresponding to the blue (B), a signal line 624-1 corresponding to the ground (GND), a light emitting diode 641-1 that emits red (R) color light, a light emitting diode 642-1 that emits greed (G) color light, and a light emitting diode 643-1 that emits blue (B) color light.

Regarding the red (R), the light emitting diode 641-1 is provided to be connected between the signal line 621-1 and the signal line 624-1 corresponding to the ground (GND).

Regarding the greed (G), the light emitting diode 642-1 is provided to be connected between the signal line 622-1 and the signal line 624-1 corresponding to the ground (GND).

Regarding the blue (B), the light emitting diode 643-1 is provided to be connected between the signal line 623-1 and the signal line 624-1 corresponding to the ground (GND).

Similarly, the second lighting unit 431-2 to the n-th lighting unit 431-n are provided with signal lines 621-2 to 621-n corresponding to the red (R), signal lines 622-2 to 622-n corresponding to the green (G), signal lines 623-2 to 623-n corresponding to the blue (B), signal lines 624-2 to 624-n corresponding to the ground (GND), light emitting diodes 641-2 to 641-n that emit the red (R) color light, light emitting diodes 642-2 to 642-n that emit the greed (G) color light, and light emitting diodes 643-2 to 643-n that emit the blue (B) color light.

In an example in FIG. 12, the plurality of lighting units 431-1 to 431-n are connected using the magnetic force of the magnet, all of the signal lines 621-1 to 621-n corresponding to the red (R) are connected, all of the signal lines 622-1 to 622-n corresponding to the green (G) are connected, all of the signal lines 623-1 to 623-n corresponding to the blue (B) are connected, and all of the signal lines 624-1 to 624-n corresponding to the ground (GND) are connected in the plurality of lighting units 431-1 to 431-n. The connection of the signal lines of such colors (connection of electrodes of colors) is realized by contact between the terminals (contact points) corresponding to the respective colors in the adjacent lighting units.

In the embodiment, the drive circuit 601 is provided inside or outside the control device 12, and is controlled by the control unit 104 of the control device 12. In a case where the drive circuit 601 is provided outside the control device 12, the drive circuit 601 and the control device 12 are connected to be capable of communicating with each other via a wired cable (not illustrated) or wirelessly.

The drive circuit 601 is connected to one lighting unit (in the example in FIG. 12, the first lighting unit 431-1), and outputs (supplies) signals corresponding to the colors to the signal lines 621-1, 622-1, and 623-1 corresponding to the colors which are provided in the lighting unit 431-1. In addition, the drive circuit 601 connects the ground (for example, a ground portion) to the signal line 624-1 corresponding the ground (GND) provided in the lighting unit 431-1.

Here, the signals corresponding to the colors which are output to the lighting unit 431-1 from the drive circuit 601 are signals of voltages, for example. A value of the voltage is controlled by the control unit 104, thereby controlling of the emission of the respective colors of the light emitting diodes 641-1 to 641-n that emit red (R) color light in the plurality of lighting units 431-1 to 431-n, the light emitting diodes 642-1 to 642-n that emit green (G) color light, and the light emitting diodes 643-1 to 643-n that emit blue (B) color light is performed.

In this manner, the same color light is emitted from the plurality of lighting units 431-1 to 431-n. For example, the color may be any one color of the red (R), the green (G), and the blue (B), or may be any two colors in which a substantially intermediate color may be displayed, or may be three colors in which a substantially intermediate color may be displayed.

Figure 13:
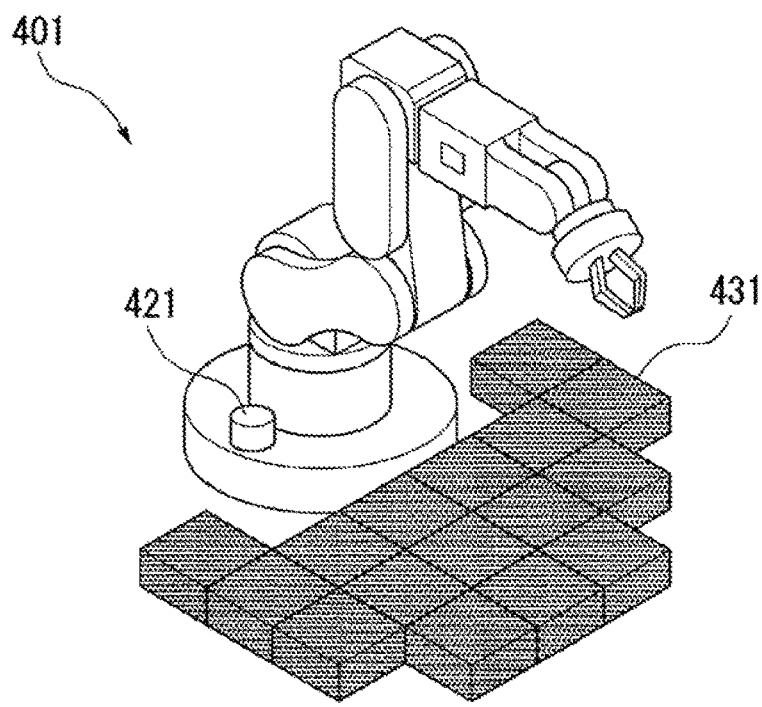
FIG. 13 is a diagram illustrating an example of a display color of the lighting unit according to the embodiment (second embodiment) of the invention.
Figure 14:
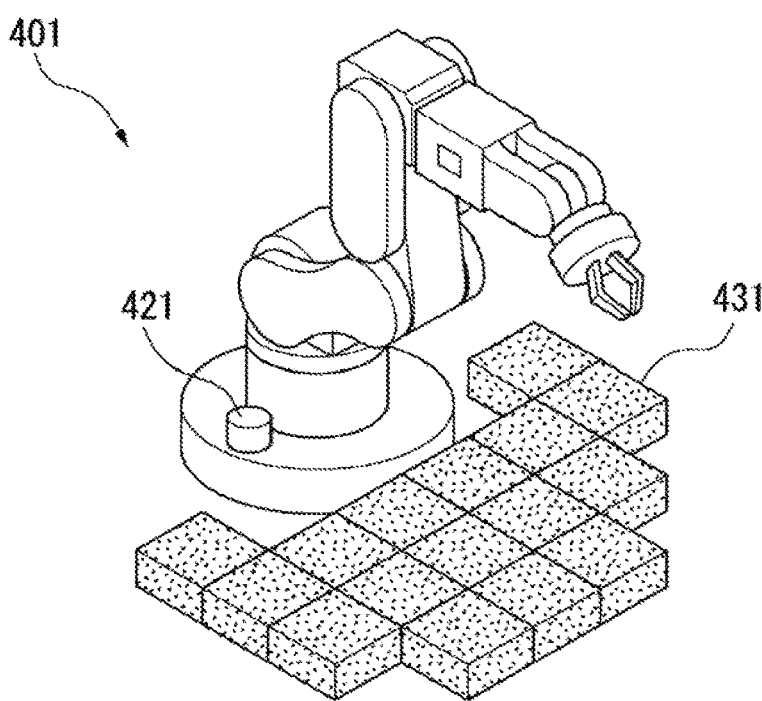
FIG. 14 is a diagram illustrating another example of the display color of the lighting unit according to the embodiment (second embodiment) of the invention.
Figure 15:
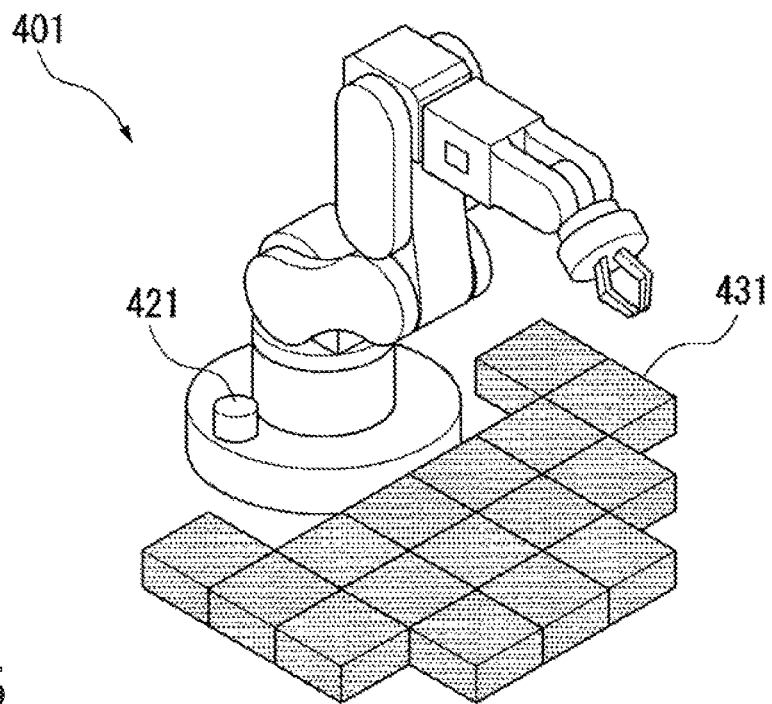
FIG. 15 is a diagram illustrating still another example of the display color of the lighting unit according to the embodiment (second embodiment) of the invention.

FIGS. 13, 14, and 15 are diagrams illustrating an example of the display color of the lighting unit 431 according to the embodiment (second embodiment) of the invention.

In the example in FIG. 13, in a case where an object (for example, a human) is not present inside a range for which the distal end of the end effector of the robot 401 reaches, and outside in the vicinity of the range, the control unit 104 displays light of a predetermined color (for example, the green (G) or the blue (B)) from the lighting unit 431. The color indicates safety.

In the example in FIG. 14, in a case where an object (for example, a human) is not present inside the range for which the distal end of the end effector of the robot 401 reaches, but an object is present outside in the vicinity of the range, the control unit 104 displays light of a predetermined color (for example, the yellow (Y)) from the lighting unit 431. The color indicates a caution.

In the example in FIG. 15, in a case where an object is present inside the range for which the distal end of the end effector of the robot 401 reaches, the control unit 104 displays light of a predetermined color (for example, the red (R)) from the lighting unit 431. The color indicates an urgent caution.

The control unit 104 controls the color displayed by the lighting unit 431 according to the distance by which the object (for example, a human) approaches the robot 401, based on information of the detection results by the second object detector 421.

Figure 16:
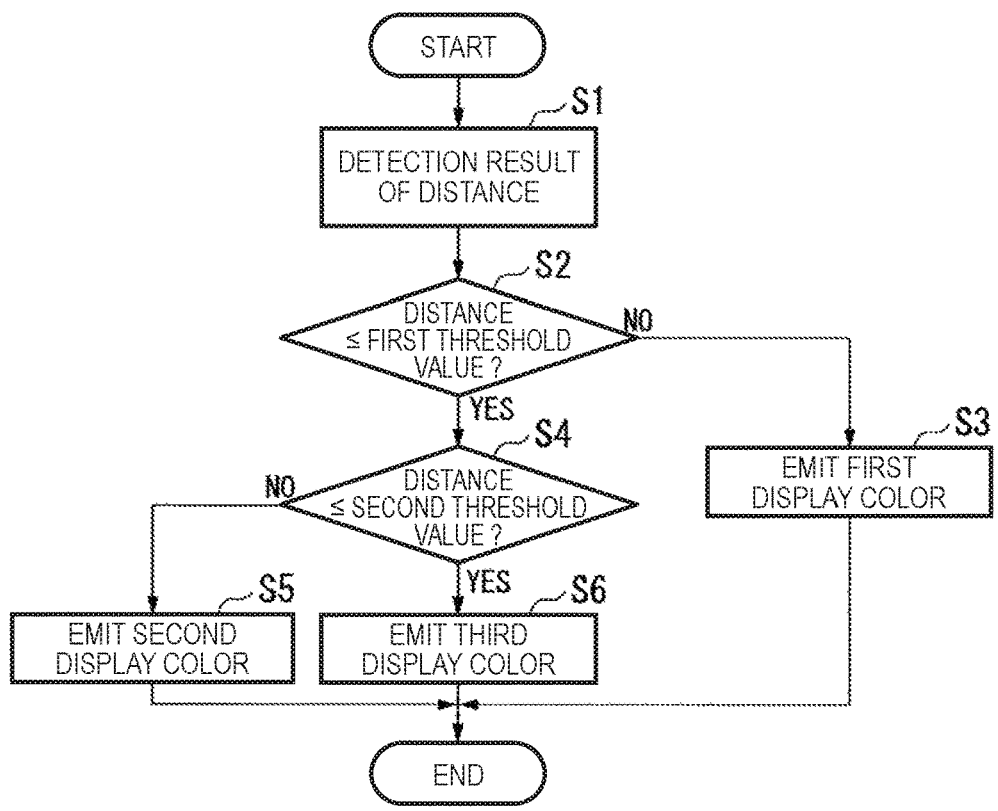
FIG. 16 is a flowchart illustrating an example of a procedure of a process in which a control unit controls the display color of the lighting unit according to the embodiment (second embodiment) of the invention.

FIG. 16 is a flowchart illustrating an example of a procedure of a process in which the control unit 104 controls the display color of the lighting unit 431 according to the embodiment (second embodiment) of the invention.

The control unit 104 acquires information of the results of detection of the distance related to the object present on the periphery of the robot 401 (Step S1).

The control unit 104 determines whether or not the acquired distance exceeds the first threshold value (Step S2).

In a case where it is determined that the acquired distance exceeds the first threshold value based on the determination result in Step S2, the control unit 104 performs control such that a first display color (for example, the green (G) or the blue (B)) is emitted from the lighting unit 431 (Step S3). The process of the flow is ended.

On the other hand, in a case where it is determined that the acquired distance is smaller than or equal to the first threshold value based on the determination result in Step S2, the control unit 104 determines whether or not the acquired distance exceeds the second threshold value (the second threshold value as a value smaller than the first threshold value) (Step S4).

In a case where it is determined that the acquired distance exceeds the second threshold value based on the determination result in Step S4, the control unit 104 performs control such that a second display color (for example, the yellow (Y)) is emitted from the lighting unit 431 (Step S5). The process of the flow is ended.

On the other hand, in a case where it is determined that the acquired distance is smaller than or equal to the second threshold value based on the determination result in Step S4, the control unit 104 performs control such that a third display color (for example, the red (R)) is emitted from the lighting unit 431 (Step S6). The process of the flow is ended.

Display Depending on Region in which Target Portion of Robot is Present

Here, the control unit 104 may determine a region in which a portion (target portion) of the movable unit of the robot which is an arbitrary target is present, and may control to display information depending on the determined region.

Any region may be used as the region.

For example, a portion (for example, the first portion) as a target of detection of the speed may be used as the target portion.

As an example, the high-speed region R1, the low-speed region R2, and the maximum-speed-change region R3 illustrated in FIG. 1 may be used as a region in which the target portion is present.

In this case, the control unit 104 determines whether the region in which the target portion is present is the high-speed region R1, the low-speed region R2, or the maximum-speed-change region R3. The control unit 104 causes different information to be displayed for each determined region. For example, in the case where the control unit 104 determines that the region in which the target portion is present is the low-speed region R2, the control unit causes information of the green color (or the blue color) to be displayed. In the case where the control unit determines that the region in which the target portion is present is the maximum-speed-change region R3, the control unit causes information of the yellow color to be displayed. In the case where the control unit determines that the region in which the target portion is present is the high-speed region R1, the control unit causes information of the red color to be displayed.

Display Depending on Region in which Object is Present

Here, the control unit 104 may determine the region in which the object (for example, a human) is present, based on the information of the detection results by the second object detector 421, and may control to display information depending on the determined region.

Any region may be used as the region.

As an example, the high-speed region R1, the low-speed region R2, and the maximum-speed-change region R3 illustrated in FIG. 1 maybe used as a region in which the object is present.

In this case, the control unit 104 determines whether the region in which the object is present is the high-speed region R1, the low-speed region R2, or the maximum-speed-change region R3, based on the information of the detection results by the second object detector 421. The control unit 104 causes different information to be displayed for each determined region. For example, in the case where the control unit 104 determines that the region in which the object is present is the low-speed region R2, the control unit causes information of the green color (or the blue color) to be displayed. In the case where the control unit determines that the region in which the target portion is present is the maximum-speed-change region R3, the control unit causes information of the yellow color to be displayed. In the case where the control unit determines that the region in which the target portion is present is the high-speed region R1, the control unit causes information of the red color to be displayed.

Conclusion of Second Embodiment

As described above, in the embodiment, for example, as illustrated in the example of FIGS. 7 to 9, information of a color or the like is displayed on the display unit 321 provided in the movable unit of the robot 301 through different display methods depending on an approach distance (region or the like) of the object (for example, a human) to the robot 301. In this manner, the displayed information (information notified through display) is easily recognized by a person (operator) or the like who performs work related to the robot 301, and it is possible to visually check that the control unit 104 of the robot 301 detects the operator and the approaching distance (region or the like) is determined. In the embodiment, it is possible to display the information in a portion in which the information is easily seen by the operator or the like.

In addition, in the embodiment, for example, as illustrated in the example of FIGS. 10 to 15, information of the color is displayed by the lighting units 431 which are laid in the movable range of the robot 401, by using different colors of display depending on the approach distance (region or the like) of the object (for example, a human) to the robot 401. In this manner, the displayed information (information notified through display) is easily recognized by a person (operator) or the like who performs work related to the robot 401, and it is possible to visually check that the control unit 104 of the robot 401 detects the operator and the approaching distance (region or the like) is determined. In the embodiment, it is possible to display the information in a portion in which the information is easily seen by the operator or the like.

For example, in the related art, it is difficult for the operator to determine whether or not the operator or the like is recognized by the control unit of the robot in some cases. For example, it is necessary for the operator to watch the screen of the teaching device (for example, a teaching pendant) in order to perform such a determination, in some cases.

On the other hand, in the embodiment, it is possible for the operator to easily perform such determination.

In the embodiment, both of the display according to the example in FIGS. 7 to 9 and the display according to the example in FIGS. 10 to 15 may be performed.

In addition, in the embodiment, a configuration, in which one or both of the display according to the example in FIGS. 7 to 9 and the display according to the example in FIGS. 10 to 15 are performed, may be realized together with the configuration in which the control of the maximum speed of the robot according to the example in FIG. 3 is performed, or may be separately realized from the configuration in which the control of the maximum speed of the robot according to the example in FIG. 3 is performed.

In addition, in the case where the plurality of robots are provided, the display according to the embodiment maybe applied to one or more robots of the plurality of robots.

Conclusion of Embodiments Above

As an example of such a configuration of the robot, in the robot (in the example in FIG. 1, the robot 11) including the movable units (in the example in FIG. 1, the manipulator Ml and the end effector E1) that is movable in a first region (in the example in FIG. 1, the high-speed region R1) and in a second region (in the example in FIG. 1, the low-speed region R2), the speed (in the example in FIG. 3, the safety speed) of the first portion, which is obtained in a case where the first portion (for example, a portion that is arbitrarily set) of the movable unit is positioned within the second region, is not 0 and is limited to a speed lower than the maximum speed of the first portion in a case where the first portion is positioned within the first region.

As an example of the configuration, in the robot, the second region is positioned farther apart from the base (in the example in FIG. 1, the base B1) of the movable unit than the first region.

As another example of the configuration, in the robot, the base is disposed within the first region.

As still another example of the configuration, in the robot, the third region (in the example in FIG. 1, the maximum-speed-change region R3) in which the maximum speed of the first portion changes, is set between the first region and the second region.

As still another example of the configuration, the robot includes the first object detectors (in the example in FIG. 1, the first object detectors 31-1 to 31-4) which detect a first object (in the example in FIG. 3, a human 201).

In still another aspect of the configuration, in the robot, the third region, in which the maximum speed of the first portion changes, is set between the first region and the second region. The robot may include the first object detector that detects a first object. In a case where the first object is determined to enter the third region based on a detection result of the first object detector, the speed of the first portion in the first region is limited to a speed (for example, the safety speed) lower than the maximum speed of the first portion in the first region in a case where the first object is not determined to enter the third region.

In still another example of the configuration, in the robot, the third region, in which the maximum speed of the first portion changes, is set between the first region and the second region. The robot includes a first object detector that detects a first object. The position of the third region which is obtained in the case where the distance between the first object and the robot is the first distance is closer (expansion and reduction of the region according to FIGS. 4 and 5) to the base than the position of the third region which is obtained in a case where the distance between the first object and the robot is the second distance longer than the first distance.

As still another example of the configuration, the robot includes the speed detector (in the example in FIG. 1, the speed detector 21) which detects the speed of the first portion.

As still another example of the configuration, the robot includes the force detector (in the example in FIG. 1, the force detector 22) which detects a force.

As still another example of the configuration, the robot (the robot 301 in the example in FIG. 7 and the robot 401 in the example in FIG. 10) includes the second object detector that detects the distance to the second object (for example, any object, the same object as the first object, or a different object) and the display unit (in the example in FIG. 7, the display unit 321 and, in the example in FIG. 10, the lighting unit 431) that displays the information related to the distance.

As still another example of the configuration, in the robot, the display unit is provided in the movable unit (for example, the example in FIG. 7).

As still another example of the configuration, in the robot, the information that is displayed on the display unit varies depending on each of the case where the first portion is positioned within the first region, the case where the first portion is positioned within the second region, and the case where the first portion is positioned within the third region (region between the first region and the second region, in which the maximum speed of the first portion changes).

As still another example of the configuration, the control device (in the example in FIG. 1, the control device 12) that controls such a robot is provided.

As still another example of the configuration, the robot system (in the example in FIG. 1, the robot system 1, and, in the example in FIG. 6, the robot system 1A) including: the robot described above; and a control device that controls the robot is provided.

A program for executing a function of any configurational unit in the device (for example, the control device 12 or the like) described above may be recorded (stored) in a computer-readable recording medium (storage medium), and the program may be read and executed by a computer system. The "computer system" includes an operating system (OS) or hardware such as peripheral equipment or the like. In addition, the "computer-readable recording medium" means a portable medium such as a flexible disk, a magneto-optical disk, a read only memory (ROM), or a CD (compact disc)-ROM, or a storage device such as hard disk installed in the computer system. Further, the "computer-readable recording medium" includes one that temporarily stores a program, such as a volatile memory (RAM: random access memory) in the computer system as a server or a client in a case where the program is transmitted via a network such as Internet or a communication line such as a telephone line.

In addition, the program may be transmitted to anther computer system from the computer system in which the program is stored in the storage device or the like, via the transmission medium or through transmission waves of the transmission medium. Here, the "transmission medium" that transmits the program means a medium that has a function of transmitting the information via the network (communication network) such as the internet or the communication line (communication circuit line) such as the telephone line.

In addition, the program described above may be used to realize a part of the function described above. Further, the program described above may be able to realize the function described above by being combined with a program stored in advance in the computer system or may be a difference file (difference program).

As described above, the embodiments of the invention are described in detail with reference to the figures; however, a specific configuration is not limited to the embodiments, and includes design obtained within a range without departing from the gist of the invention.

The entire disclosure of Japanese Patent Application Nos. 2016-097689, filed May 16, 2016 and 2017-027617, filed Feb. 17, 2017 are expressly incorporated by reference herein.

What is claimed is:

1. A robot comprising:
a base;
an arm connected to the base, the arm being configured to move in a first region and a second region that surround the base, the first region being closer to the base than the second region;
a motor configured to move the arm at first and second speeds, the first speed being faster than the second speed;
a first sensor located in the second region, the first sensor being configured to detect part of a human in the second region;
a second sensor located in the first region, the second sensor being configured to detect the part of the human in the first region and the second region, the second sensor being configured to detect a moving direction and a moving distance of the part of the human;
a force sensor configured to detect an external force applied to the arm:
a memory configured to store a program; and
a controller configured to execute the program so as to:
set the first region and the second region in a work space of the robot, the first region being expandable into the second region so that an area of the first region is expandable;
cause the motor to move the arm at the first speed in the first region and to move the arm at the second speed in the second region;
cause the motor to move the arm at a lower speed than the first speed in the first region and to move the arm at a lower speed than the second speed in the second region when the first sensor detects the part of the human in the second region and when the force sensor does not detect the external force;
stop the motor when the first sensor detects the part of the human in the second region and when the force sensor detects the external force; and
expand the first region into part of the second region so that an area of the first region is expanded when the second sensor detects that the detected moving direction is away from the base,
wherein the controller is configured to determine the expanded area based on the detected moving distance.

2. The robot according to claim 1, further comprising:
a third region that is located between the first region and the second region,
wherein the controller is configured to cause the motor to move the arm at a different speed than the first speed in the third region.

3. The robot according to claim 1, further comprising:
a third region that is located between the first region and the second region,
wherein the controller is configured to cause the motor to move the arm at the lower speed than the first speed in the first region when the first sensor detects the part of the human in the third region.

4. The robot according to claim 1, further comprising:
a third region that is located between the first region and the second region,
wherein the controller is configured to change a location of the third region based on the detected moving distance between the part of the human and the second sensor.

5. The robot according to claim 1, further comprising:
a speed detector that is disposed in the arm so as to detect a speed of the movement of the arm.

6. The robot according to claim 1, further comprising:
a display configured to display information related to the detected moving distance.

7. The robot according to claim 6,
wherein the display is provided in the arm.

8. The robot according to claim 6,
wherein the controller is configured to cause the display to display different contents as the information depending on a location of the arm with respect to the first region and the second region.

* * * * *